(12) United States Patent
Davis

(10) Patent No.: US 6,389,341 B1
(45) Date of Patent: May 14, 2002

(54) CONTROL SYSTEM FOR A VEHICLE SUSPENSION

(75) Inventor: Leo W. Davis, Dallas, TX (US)

(73) Assignee: Davis Family Irrevocable Trust, Harlingen, TX (US)

(*) Notice: Subject to any disclaimer, the term of this patent is extended or adjusted under 35 U.S.C. 154(b) by 0 days.

(21) Appl. No.: 09/760,358

(22) Filed: Jan. 12, 2001

(51) Int. Cl.[7] .................................................. F16F 5/00
(52) U.S. Cl. ................... 701/37; 267/64.13; 188/266.5; 188/266.7; 188/274; 92/9; 92/168; 280/5.506; 280/5.507; 280/5.517
(58) Field of Search ...................... 701/37; 280/5.506, 280/5.507, 5.517, 5.518; 188/266.5, 266.7, 268, 274, 276, 322.22; 180/169; 92/9, 168; 267/64.13

(56) References Cited

U.S. PATENT DOCUMENTS 4,770,438 A * 9/1988 Sugasawa et al. ....... 280/5.518
4,877,222 A * 10/1989 Davis ...................... 267/64.13

* cited by examiner

Primary Examiner—William A. Cuchlinski, Jr.
Assistant Examiner—Marthe Marc-Coleman
(74) Attorney, Agent, or Firm—Howison, Thoma & Arnott, L.L.P.

(57) ABSTRACT

A suspension system (20) controls the amount of compressible fluid (42) within struts (28) to determine spring rate coefficients ($K_s$) and dampening coefficients ($B_s$) for the struts (28). The spring rate and dampening coefficients ($K_s$, $B_s$) are selected to provide forces (F) which are a sum of several components, which include a desired target static force ($F_d$) for balancing various forces acting upon a vehicle chassis, comparison of the target strut force ($F_d$) to the actual force (F) applied by the respective struts (28), comparison of velocity ($\dot{z}_s$) of the chassis relative to a selected reference datum, and a ride height error ($e_{rh}$). Frequency dependant filtering decreases the spring rate coefficients ($K_s$) when changes in position ($Z_s$) are detected at frequencies ($\omega$) beneath a threshold level ($\omega_K$), and decreases the dampening coefficients ($B_s$) when changes in velocity ($\dot{z}_s$) are detected at frequencies ($\omega$) above a threshold level ($\omega_B$).

31 Claims, 22 Drawing Sheets

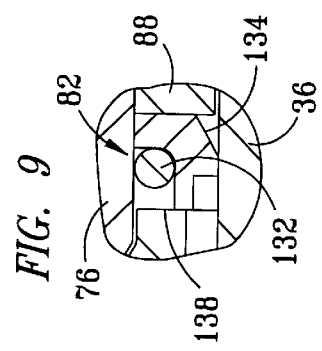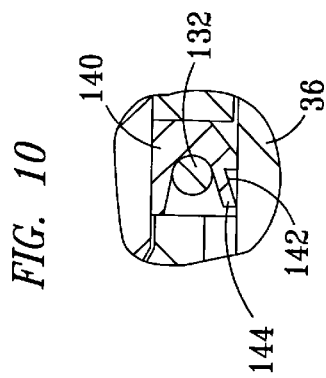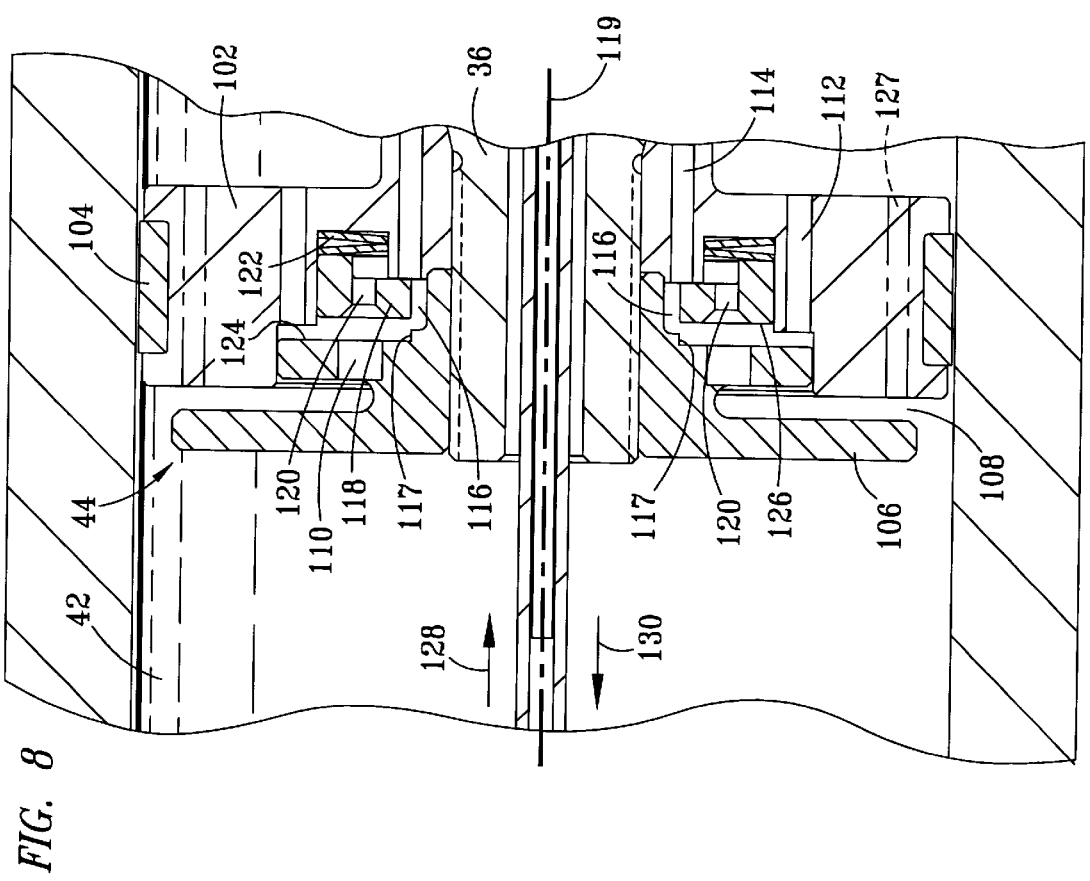

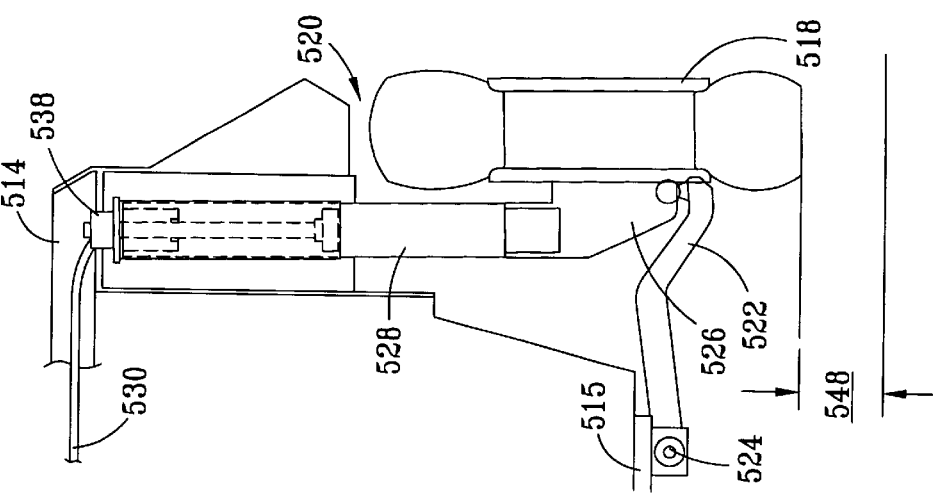
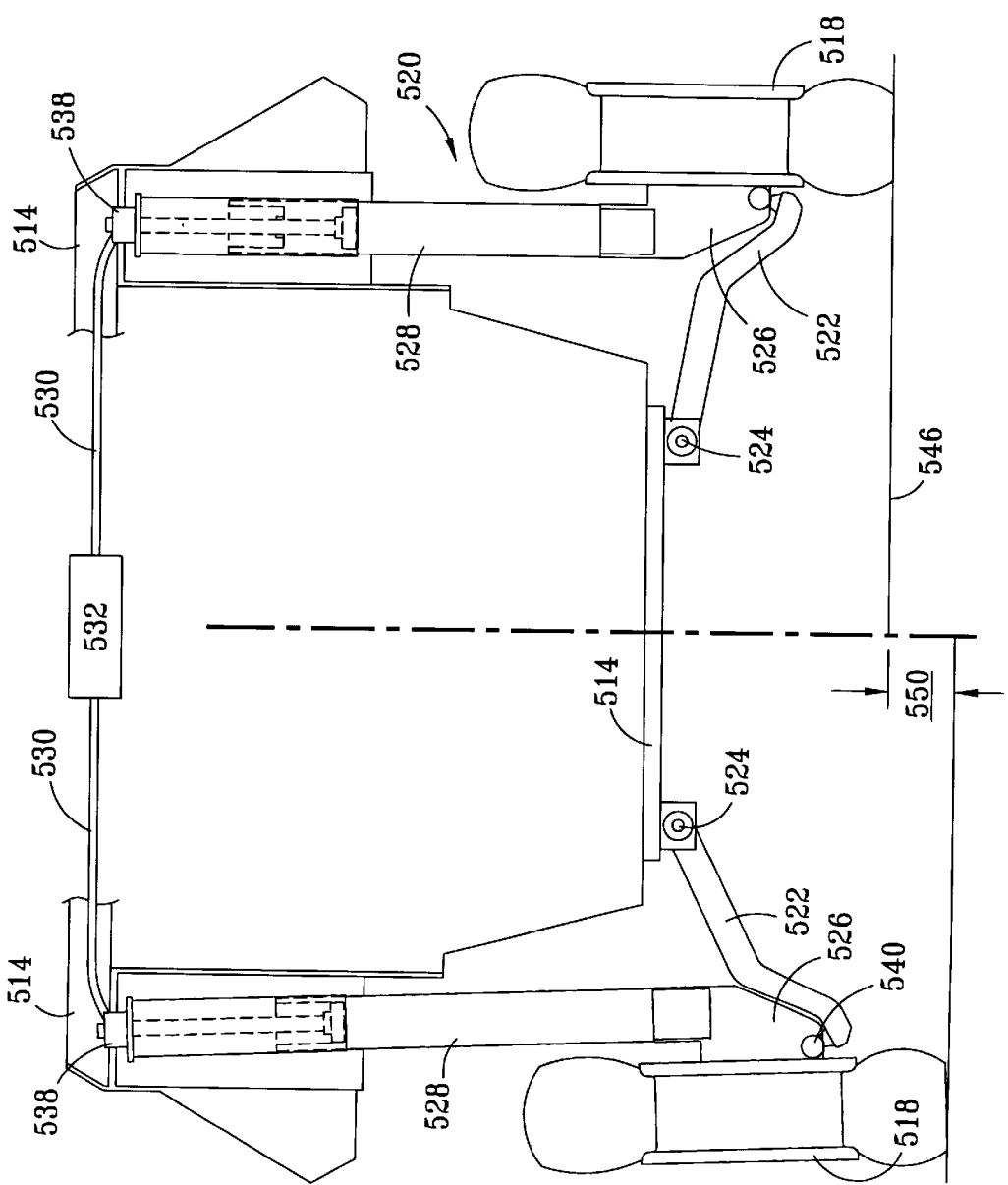

CONTROL SYSTEM FOR A VEHICLE SUSPENSION

TECHNICAL FIELD OF THE INVENTION

The present invention is related to suspension systems for motor vehicles, and in particular to a control system for a vehicle suspension system having struts which contain a compressible fluid.

BACKGROUND OF THE INVENTION

Prior art suspension systems have been provided for motor vehicles to isolate the vehicle frame, or chassis, from impacts and vibrations resulting from vehicle wheels traversing uneven terrain. Vehicle ride characteristics have complex dynamics characterized by nonlinearities, vehicle roll and pitch, vehicle flexibility effects, varying parameters, unknown friction, deadzones and high amplitude disturbances. Excess vibration results in artificial vehicle speed limitations, reduced vehicle-frame life, biological effects on passengers and detrimental consequences to cargo. Present automobile suspension systems traditionally use passive suspension systems which can only offer a compromise between the two conflicting criteria of comfort and performance by providing spring and dampening coefficients of fixed rates. For example, sports cars usually have stiff, harsh, performance suspensions with poor ride quality, while luxury sedans typically have softer suspensions with poor road handling capabilities. Passive suspension systems have been provided by separate coil springs and shock absorbing dampers, in which power is not input by a controlled power source to counteract impacts and vibrations resulting from traversing the rough terrain. The traditional engineering practice of designing spring and dampening functions as two separate functions has been a compromise from its inception in the late 1800s. As a result, vehicles have always been designed, styled and built around the space-weight requirements and performance limitations of traditional suspension configurations. Due to the demands of increased fuel mileage and decreased emissions, passenger and commercial vehicles are becoming lighter, which results in the differences between laden and unladen weights of the vehicles becoming so broad that traditional suspension systems are unable to span the load range effectively, causing serious degradation in performance of the vehicle ride quality, load handling and control.

Active suspension systems attempt to reduce these undesirable ride characteristics by providing active, powered components which isolate the car body from tire vibrations induced by uneven terrain, to provide improved comfort, road handling performance and safety for a variety of terrains and vehicle maneuvers. In active vehicle suspension systems, actuators are provided to actively apply forces which counteract and balance forces applied to the chassis of the motor vehicle.

Such active systems have used various control schemes to determine the amount of force which actuators should apply to the vehicle chassis to provide a smoother ride, such as schemes based on balancing the forces acting on the chassis and schemes based on supporting the vehicle chassis at a selected ride height. Active suspension systems should be able to provide different behavioral characteristics dependent upon various road conditions, without going beyond the travel limits of active suspension components. However, active systems typically require large power inputs to provide an actuator that is quick enough to compensate for impacts and vibrations which occur at desired traveling velocities over rough terrain. The power requirements for such fully active suspension systems are generally prohibitively demanding.

My prior art passive suspension systems have utilized struts, which include a cylinder that contains a compressible fluid that is not a gaseous fluid, but is instead preferably liquid. A rod extends into a cylinder and provides a fluid displacement device, such that the fluid pressure within the cylinder is increased by displacement of the compressible fluid when the rod is inserted further into the cylinder. A piston is mounted to the inward end of the rod and provides a dampening device. Such struts have effectively combined into a single unit the spring and damper functions of prior art suspension system components. Control means have also been suggested for such strut systems, in which the fluid pressure within the struts are controlled to determine spring rate coefficients for the struts.

SUMMARY OF THE INVENTION

A strut using compressible fluid is provided for supporting a suspended body relative to a support member which is subject to vibratory motion. The system includes struts which have respective cylinders with inner bores that define cylinder chambers. A compressible fluid is disposed within the cylinder chambers. Fluid displacement members are moveably extensible into each of the cylinder chambers, and respective seals sealingly engage between heads of each of the cylinders and the fluid displacement members to retain the compressible fluid within the cylinders. The struts supportively engage between the suspended body and the support member, with first ends of the struts connected by the respective fluid displacement members to the support members, and the second ends of the struts connected by the respective cylinders to the suspended body. An accumulator is pressurized by a pump and is connected to the cylinder chambers of the various struts by control valves. The control valves are operated to apply fluid pressure from the accumulator to the cylinder chambers to determine the values for the spring rate coefficients and dampening coefficients of the struts. Sensors are operatively connected to the struts for detecting positions of the suspended body relative to the support member. A data processing unit is operatively connected to the sensors and the control valves of each of the struts. The data processing unit emits control signals to the control valves to determine the amount of the compressible fluid disposed within each of the struts in response to sensed values for the relative positions between the suspended body to the support member.

The amount of the compressible fluid disposed within each of the cylinders of the struts is controlled to determine values for the respective spring rate coefficients and dampening coefficients of the struts. The spring rate and dampening coefficients are selected to apply balancing forces which are equal to the sum of several force components. The first force component is a an ideal, target force component based on the amount of force required to balance the various other forces acting upon the vehicle chassis. This target force component is summed together with several feedback loop force components, which include a comparison of the desired target strut force to an actual force applied by the strut, a comparison of velocity of the chassis relative to a selected sky hook reference datum, and a ride height error which is determined by comparing the actual vehicle ride height to a desired ride height for the vehicle. Frequency dependant filtering is also applied to decrease the spring rate coefficients in response to detected changes in relative positions between the suspended body and the support member which occur at frequencies beneath a low frequency threshold level, and to increase or decrease the dampening coefficients in response to detected changes in relative motion between the suspended body and the support member which occur at frequencies above a high frequency threshold level. The threshold frequencies are preferably determined by selected offsets from corresponding wheel frequencies. The amounts by which the spring rate and dampening coefficients are increased or decreased are preferably in proportion to the difference between the detected frequencies and the respective threshold frequencies.

The struts for use in such a suspension system preferably have pistons mounted to respective fluid displacement members to divide the cylinder chambers into two opposed chambers. The dampening pistons are moveable with the fluid displacement members within the cylinder chambers. Flow paths are provided in the pistons so that fluid flow occurs between the two opposed pressure chambers of respective ones of the cylinder chambers. The fluid mass in the two opposed chambers can be changed using a servo valve controller. The compressibility of the fluid determines a spring rate coefficient, and the flow paths through the pistons determine dampening coefficients for the struts. Thus, the struts have respective spring rate coefficients and dampening coefficients, and the capacity to vary the spring rate coefficient and the dampening coefficient all in a single unit. For high-frequency motion, the passive dampening features of the strut can be relied on, such that energy is not expended trying to generate all the strut forces by active means. Such struts offer direct replacement for traditional spring/shock absorber units as well as in-line MacPherson strut spring/shock configurations. Suspension systems using such struts can provide higher performance response speeds, greater dampening power, and adjustable spring and dampening rate coefficients to maintain effective usage of the full strut travel while accommodating variations in both static and dynamic loads.

BRIEF DESCRIPTION OF THE DRAWINGS

For a more complete understanding of the present invention and the advantages thereof, reference is now made to the following description taken in conjunction with the accompanying Drawings in which:

FIG. 8 is a partial longitudinal section view of the strut, showing a moveable valve member after being moved to a second position from that shown in FIGS. 6 and 7;

FIG. 9 is a sectional view of a seal assembly;

FIG. 10 is a sectional view of an alternative seal assembly;

FIG. 38 is a frontal, partial section view of a MacPherson strut suspension system, utilizing a strut containing compressible fluid in the suspension system;

FIG. 39 is a partial section view of the MacPherson strut suspension system, showing one-quarter of the MacPherson strut suspension system during a jounce;

DETAILED DESCRIPTION OF THE INVENTION

Figure 1:
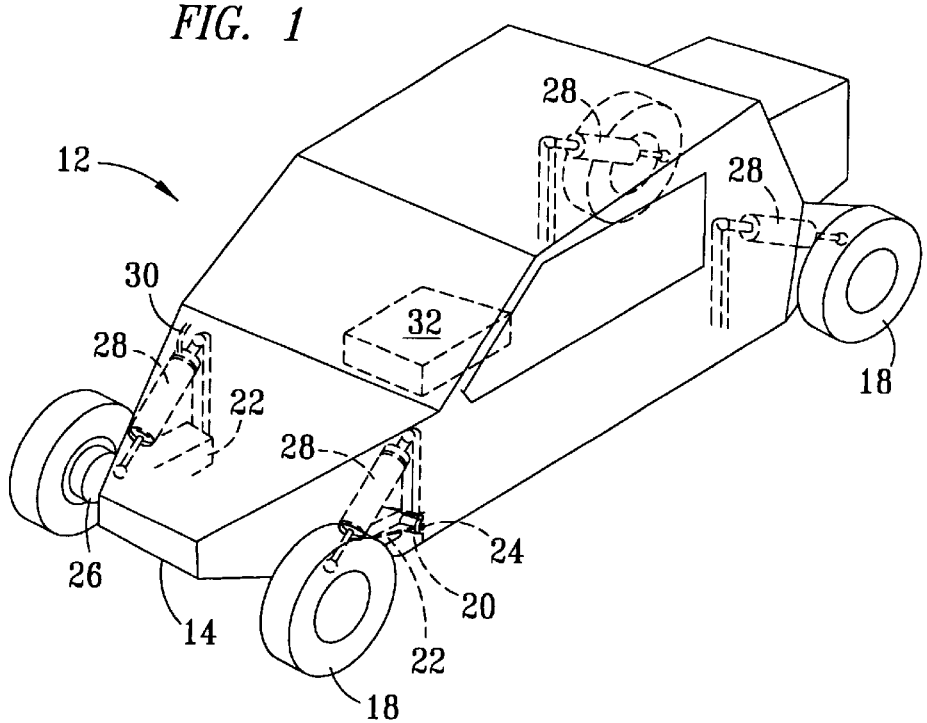
FIG. 1 is a perspective view of a vehicle chassis having a suspension system utilizing struts containing a compressible fluid.

FIG. 1 is a perspective view of a motor vehicle 12, having a frame 14, or chassis, and wheels 18. A suspension system 20 supports the frame 14 relative to the wheels 18. The suspension system 20 includes a support member 22 which provides a pivot arm linkage which is pivotally mounted to the frame 14 by a pivot pin and bearing assembly 24. The support member 22 further includes a wheel mount 26. A strut 28 extends from the frame 14 to the support member 22. The strut 28 contains a compressible fluid and may be actuated to extend or retract, to move the support member 22 about the pivot pin and bearing assembly 24. Flow lines 30 connect the struts 28 to a control unit 32.

Figure 2:
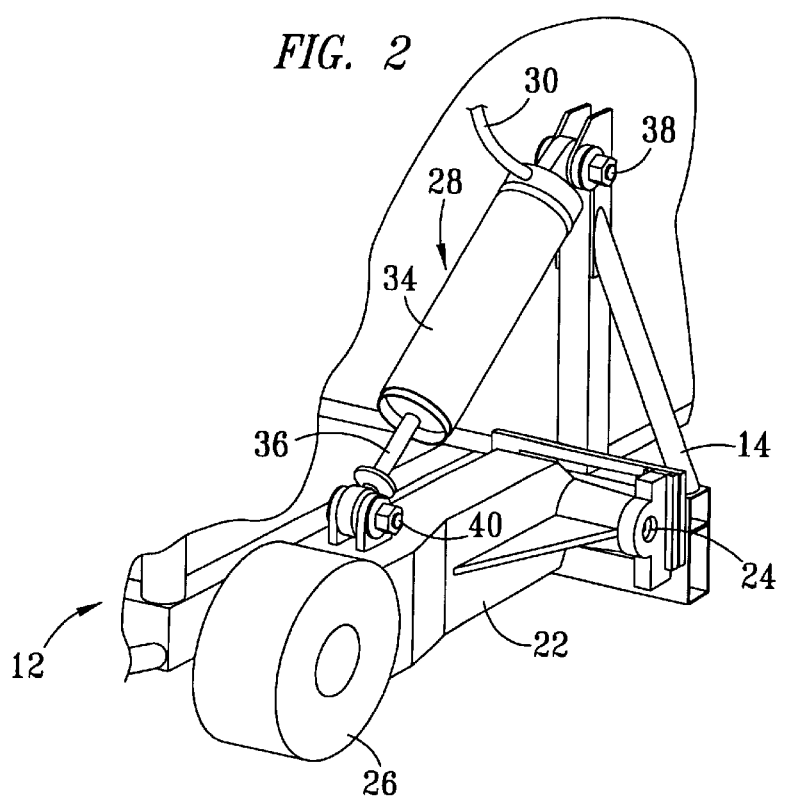
FIG. 2 is a perspective view of one-quarter of the vehicle suspension system.

FIG. 2 is a partial perspective view of the frame 14 and one of the support members 22. The strut 28 is shown including a cylinder 34 and a rod 36. The rod 36 moveably extends into the cylinder 34 and provides a fluid displacement member which extends from the frame 14 and into the cylinder 34 to displace a compressible fluid contained within the cylinder 34. The strut 28 is mounted to the frame 14 on one end by the cylinder 34 being connected to a pivot pin and bearing assembly 38, and to the support member 22 on the other end by the rod 36 being connected to a pivot pin and bearing assembly 40.

Figure 3:
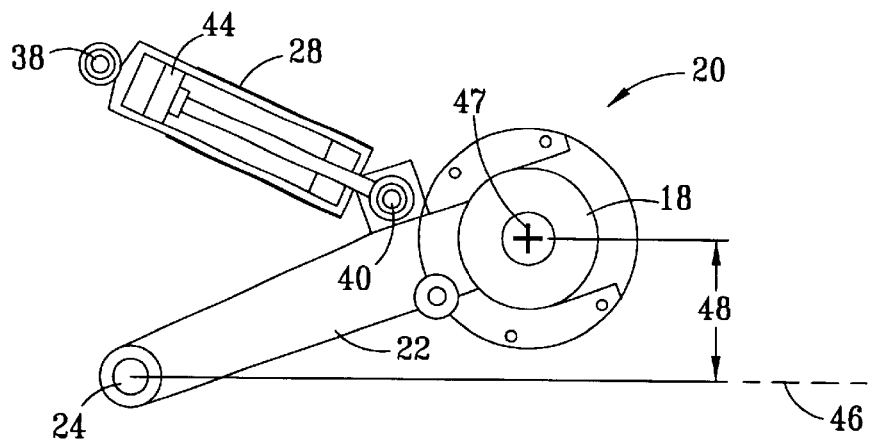
FIGS. 3, 4 and 5 are partial, side elevation views of the one-quarter suspension system shown in various positions.
Figure 4:
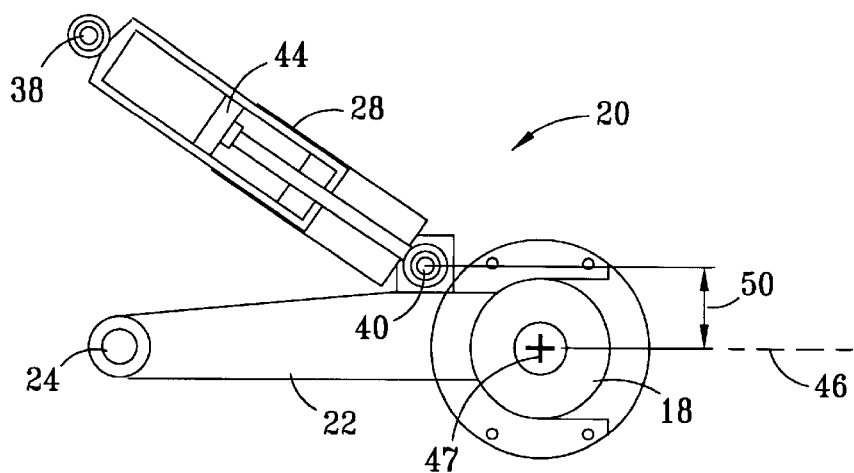
Figure 5:
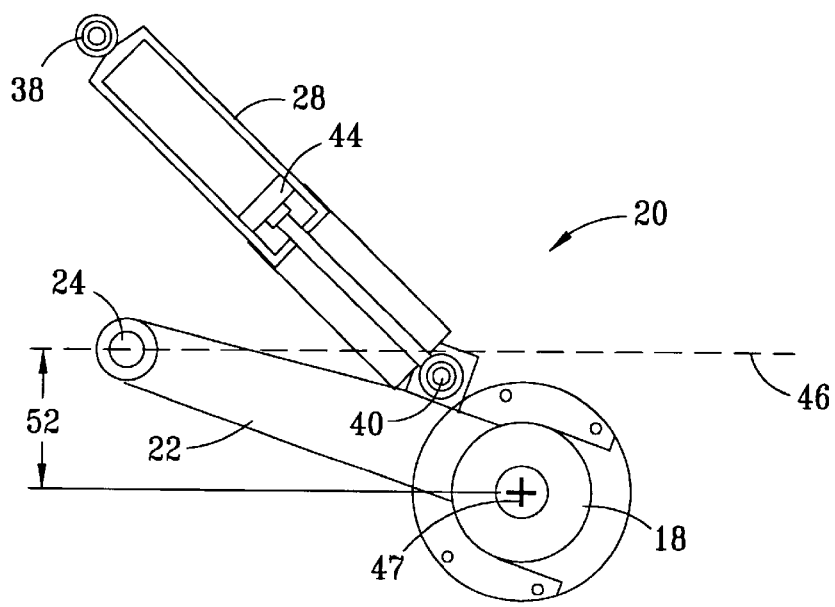

FIGS. 3 through 5 are side elevation views which schematically depict operation of the strut 28 and the support member 22 for pivotally moving the support member 22 relative to the frame 14. FIG. 4 depicts the wheel 18 disposed at a preferred height for supporting the frame 14 at a desired ride height. The support member 22 has a longitudinal axis which extends in the plane of a reference datum 46, and a central axis 47 of the wheel 18. FIG. 3 depicts the support member 22 and the wheel 18 after a jounce which causes the support member 22 to rotate counter clockwise, moving the central axis 47 of the wheel 18 a distance 48 above the reference datum 46. FIG. 5 depicts rebound of the wheel 18, in which the support member 22 is pivoted clockwise from the position shown in FIG. 3, to a point such that it is beneath reference datum 46 to dispose the central axis 47 of the wheel 18 a distance 24 beneath the reference datum 46. In moving between the positions of FIGS. 3, 4 and 5, the rod 36 moves within the cylinder 34. A damper element 44 mounted to the interior end of the rod 36. The damper element 44 is preferably a dampening piston, that does not seal against the walls of the cylinder 34. Pressure of a compressible fluid disposed within the cylinder 34 urges the rod 36 outward from within the cylinder 34. Force applied to the rod 36 to push it into the cylinder 34 compresses the fluid within the cylinder 34 to create a higher pressure therein, and exert a stronger force against the rod 36. The damper element 44 provides a flow restrictor to prevent the rod 36 from moving within the cylinder 34, and provides higher dampening forces as the velocity of the rod 36 relative to the fluid within the cylinder 34 is increased.

Figure 6:
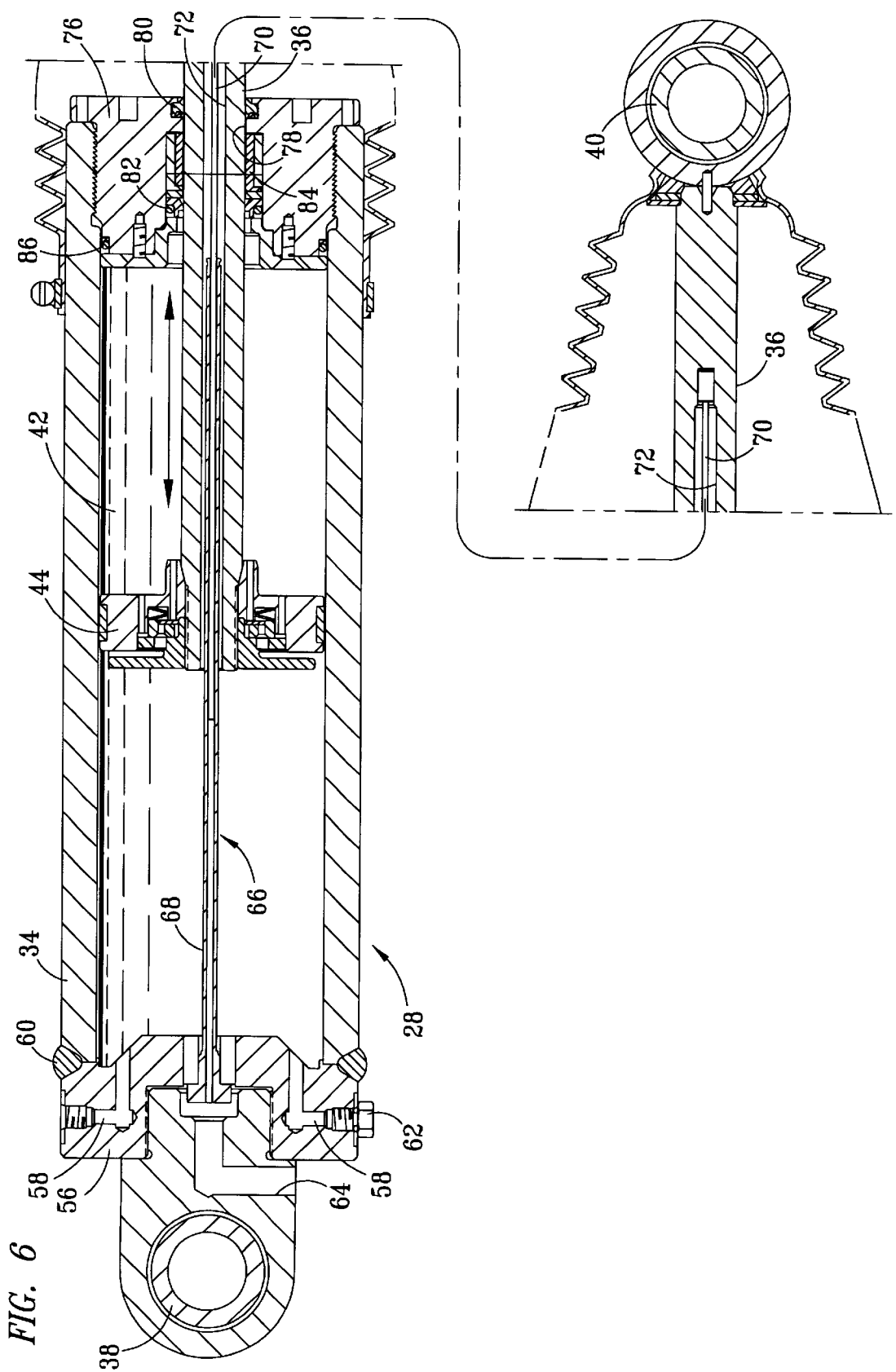
FIG. 6 is a longitudinal section view of a strut of the suspension system.

FIG. 6 is a longitudinal section view of one of the struts 28. The strut 28 includes the cylinder 34 and the rod 36. A head 56 is mounted in one end of the cylinder 34 and includes flow line ports 58. A seal 60 sealingly engages between the cylinder 34 and the head 56. A plug 62 seals one of the flow line ports 58. The other of the flow line ports 58 is preferably connected to one of the flow lines 30 (shown in FIG. 1) for passing fluid into and withdrawing fluid from the cylinder 34. A sensor port 64 is provided for connecting a relative position sensor 66 to the control unit 32 (shown in FIG. 1). The relative position sensor 66 includes an inductive sleeve 68 and a rod 70. The rod 70 is preferably mounted within a bore 72 formed into the rod 36. The inductive sleeve 68 includes a plurality of wire coils for passing a current and sensing inductance changes when the rod 70 is located in different positions relative to the inductive sleeve 68, to provide data signals which are passed through the sensor port 64 to the control unit 32. The bore hole 72 is a blind hole into the rod 36 and within which the rod 70 is secured. A second end of the cylinder 34 has a head 76 secured therein. An aperture 78 extends through the head 76 for passing the rod 36 into the cylinder 34. Seal assemblies 80 and 82 are sealingly engaged between the head 76 and the rod 36. In some embodiments, the seal assemblies 80 and 82 may be replaced by conventional lip seals. The seal assemblies 80 and 82 are discussed below in more detail. A wear ring 84 is provided for slidably engaging the rod 36, to prevent damage to the seal assemblies 80 and 82. A seal 86 is secured between the head 76 and the cylinder 34. The seal 86 is preferably an O-ring Seal. Spacers 88 and 90 are provided for spacing apart the seals 80 and 82 and the wear ring 84.

Figure 7:
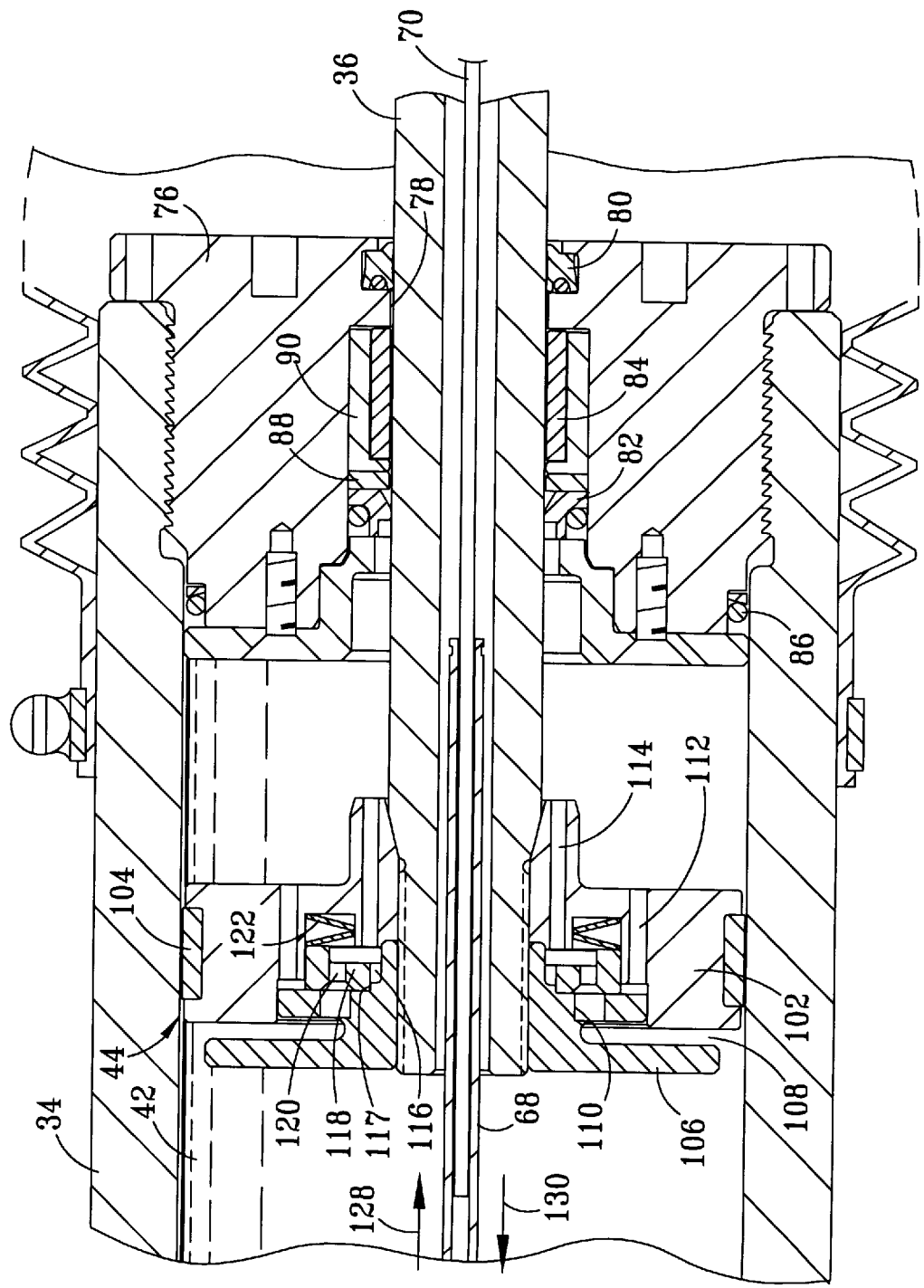
FIG. 7 is a partial longitudinal section view of the strut, shown in second position from that of FIG. 6.

FIG. 7 is a partial longitudinal section view of the strut 28, showing the damper element 44 disposed therein. The damper element 44 has a main body 102 which is mounted to the end of the rod 36, preferably being threadingly secured to the rod 36. A wear ring 104 extends around the exterior of the main body 102 to slidably engage the interior walls of the cylinder 34 as the rod 36 and the main body 104 of the damper element 44 are moved within the cylinder 34. The damper element 44 further includes a forward member 106 which is mounted forward of the main body 102, separated from the forward end of the main body 102 by a gap 108. Flow ports 110 extend into a rearward portion of the forward member 106, for passing compressible fluids 42 to flow ports 112 and 114 in the main body 102. A chamber 116 is defined between the main body 102 and the forward member 106 for housing an annular-shaped movable valve member 118, which preferably extends fully around the rod 36 and provides a damper element that is moveably secured to the piston defined by the rod 36. A relief shoulder 117 extends parallel to the longitudinal axis 119 of the strut 28 for a length of 0.057 inches to provide a pressure relief flow path once the face 126 of the annular shaped valve member 118 is moved 0.057 inches from the rearward end of the member 106, which defines a seat 124. Flow ports 127 (shown in phantom) may also be provided in larger diameter pistons to reduce the dampening coefficient, but are preferably not included in smaller diameter pistons.

The moveable valve member provides a damper element 118 that preferably extends transverse to a longitudinal axis of the rod 36 and comprises a protuberant member which extends between the rod 36 and toward an exterior of the cylinder 34 for selectively blocking a flow path through the damper element 44, by moving between first and second positions relative to the rod 36. In the preferred embodiment shown, the moveable valve member 118 extends transverse to the direction of the longitudinal axis of the rod 36 since that is the direction of movement, such that the damper element protrudes transverse to a direction of movement of the rod 36 and the damper element 118 relative to the compressible fluid 42. In other embodiments, the damper element 118 may move in other directions which are not defined by movement of either the rod 36 or the longitudinal axis of the rod, but merely by moving from a first position to a second position, or therebetween, to selectively restrict flow of the compressible fluid relative to rod 36, such as through the flow passages through the damper piston 44.

Such other directions may be parallel to the longitudinal axis of the rod 36, rather than transverse, to restrict flow through a flow path to effect a restriction of movement of the compressible fluid relative to the rod 36 in the direction of movement of the rod 36 relative to the cylinder 34, to thereby provide a fluidic dampening function.

FIG. 8 is a partial, longitudinal section view of the strut 28, showing the annular-shaped moveable valve member 118 after being moved against the force of the spring 122 by movement of the damper element 44 against the compressible fluid 42. Flow ports 120 are axially aligned around a longitudinal axis of the strut 28 and the damper element 44, and extend through the movable valve member 118 to provide flow paths for connecting the flow ports 110 to the flow ports 114. Coil springs provide bias members 122 which urge the movable valve member 118 into a forward position, sealingly engaging against the rearward portion of the flow ports 110 to prevent the compressible fluid 42 from passing from the gap 106, through the flow ports 110 and to the flow ports 112. The flow ports 120 in the moveable valve member 118 connect from the flow ports 110 to the flow ports 114, providing a flow path for metering of flow of the compressible fluid 42 through the damper element 44. The rearward end portion of the forward member 106 defines a seat 124 which extends around the exterior of the flow ports 110, and a forward seal surface 126 of the moveable valve member 118 sealingly engages against the seat 124 to prevent the compressible fluid 42 from flowing through the flow ports 110 and to the flow ports 112 and 114. Movement of the damper element 44 in a direction 128 causes the compressible fluid 42 to press against the rearward end of the moveable valve member 118 to push the forward end 126 of the moveable valve member 118 against the seat 124, preventing the compressible fluid 42 from flowing through the flow ports 112 and to the flow ports 110, and also preventing flow of the fluid 42 through the flow path 114 and to the flow ports 110, except for that portion of the fluid 42 which passes through the metering flow paths 120 in the moveable valve member 118. If the flow ports 127 (shown in phantom) are included, flow of the compressible fluid 42 will also be through the flow ports 127, preferably in either direction of travel of the damper element 44.

Movement of the damper element 44 in the direction 130 urges the compressible fluid 42 to press against the forward surface 126 of the moveable valve members 118, until sufficient force is attained to overcome the bias members 122, causing the moveable valve member 118 to move rearward and to unseat from pushing against the seat 124 of the forward member 106. This allows the compressible fluid 42 to pass through the flow ports 110 and into the flow ports 112 and from within the damper element 44. Further movement of the valve member 118 for a distance beyond 0.057 inches will cause the member 118 to move from being adjacent to the relief shoulder 117, allowing the compressible fluid 42 to flow both between the relief shoulder 117 and the valve member 118, and then through the flow ports 114. Thus, the compressible fluid 42 will flow into and through the flow port 114, by passing through both the flow path 120 and the flow path extending between the shoulder 117 and the member 118. This increases the effective size of the collective flow paths through the damper piston 44 to include both the flow ports 112 and 114, further reducing the dampening coefficient for the movement of the damper element 44. Embodiments of the pistons 44 which include the flow ports 127 (shown in phantom) will also include the flow ports 127 in the effective size of flow paths through the damper piston 44. A velocity of a minimum level is required to urge the moveable valve member 118 rearward, and once that is obtained, additional portions of the seal surface 126 of the forward end of the moveable valve member 118 is exposed, such that the moveable valve member 118 will remain in a retracted position allowing increased flow through the damper element 44. This decreases the dampening when high speeds, or high frequencies, are encountered.

FIG. 9 is a partial sectional view of the annular-shaped seal assembly 82. The seal assembly 82 includes an O-ring 132, which energizes an annular-shaped seal element 134 to press a seal surface 136 against an outer surface of the rod 36. Additionally, a fluid energized pressure surface 138 is provided on the seal element 134 such that fluid pressure on the forward end will further press the seal surface 136 against the outer surface of the rod 36. The seal 132 seals between the inner surface of the head 76 and the seal element 134, and also pushes the end 137 of the seal element 134 to sealingly engage against the head 76.

FIG. 10 is a partial section view of an alternative seal element 140. The alternative seal element 140 also includes a seal surface 142 which is pressed against the outer surface of the rod 36. An energization member such as the O'ring 132 is also provided for pushing against a fluid energized surface 144 to push the seal surface 142 into a sealing engagement with the outer surface of the rod 36. As higher fluid pressures are encountered, the fluid energized surface 144 will transmit force from the pressure to press the seal surface 142 against the surface of the rod 36 with greater force, to seal against the larger pressures. A surface 146 likewise sealingly engages against the head 76.

Figure 11:
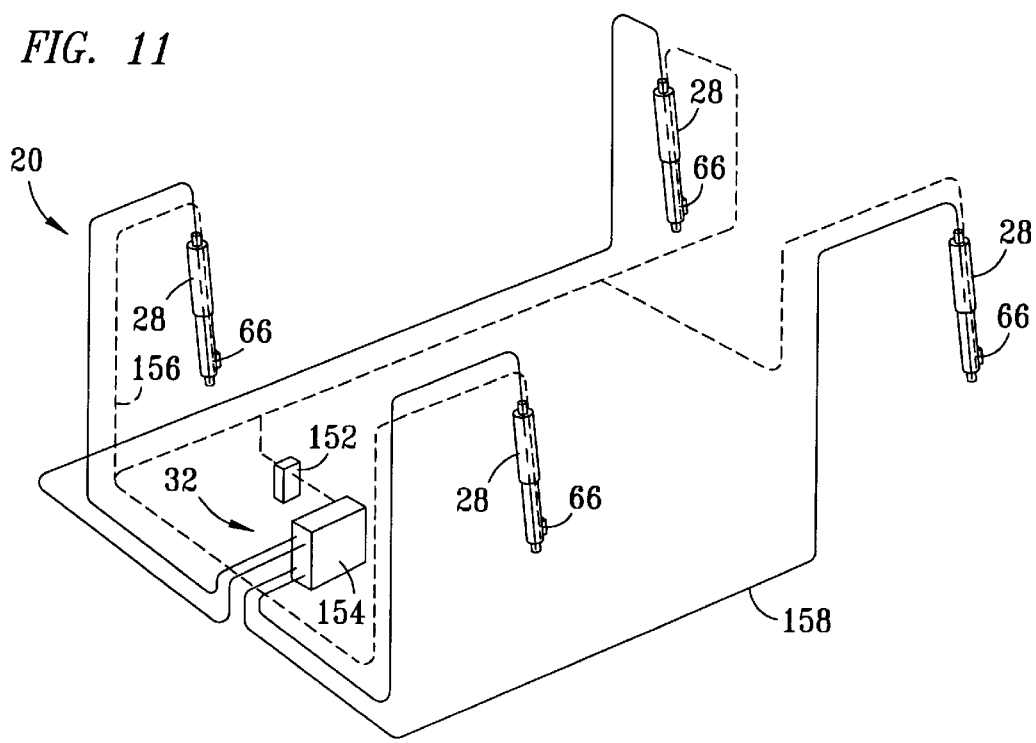
FIG. 11 is a schematic diagram of the suspension system having struts and a hydraulic power system and struts in which a compressible fluid is used.

FIG. 11 is a schematic diagram depicting the suspension system 20. The suspension system 20 includes a control unit 32. The control unit 32 includes a CPU 152 and a pressure charge system 154. Signal lines 156 connect relative position sensors 66, which are mounted to the various ones of the struts 28, to the CPU 152. Fluid lines 158 then connect from the pressure charge system 154 to various ones of the struts 28 to apply pressure to the struts 28 according to program instructions operating the CPU 152.

Figure 12:
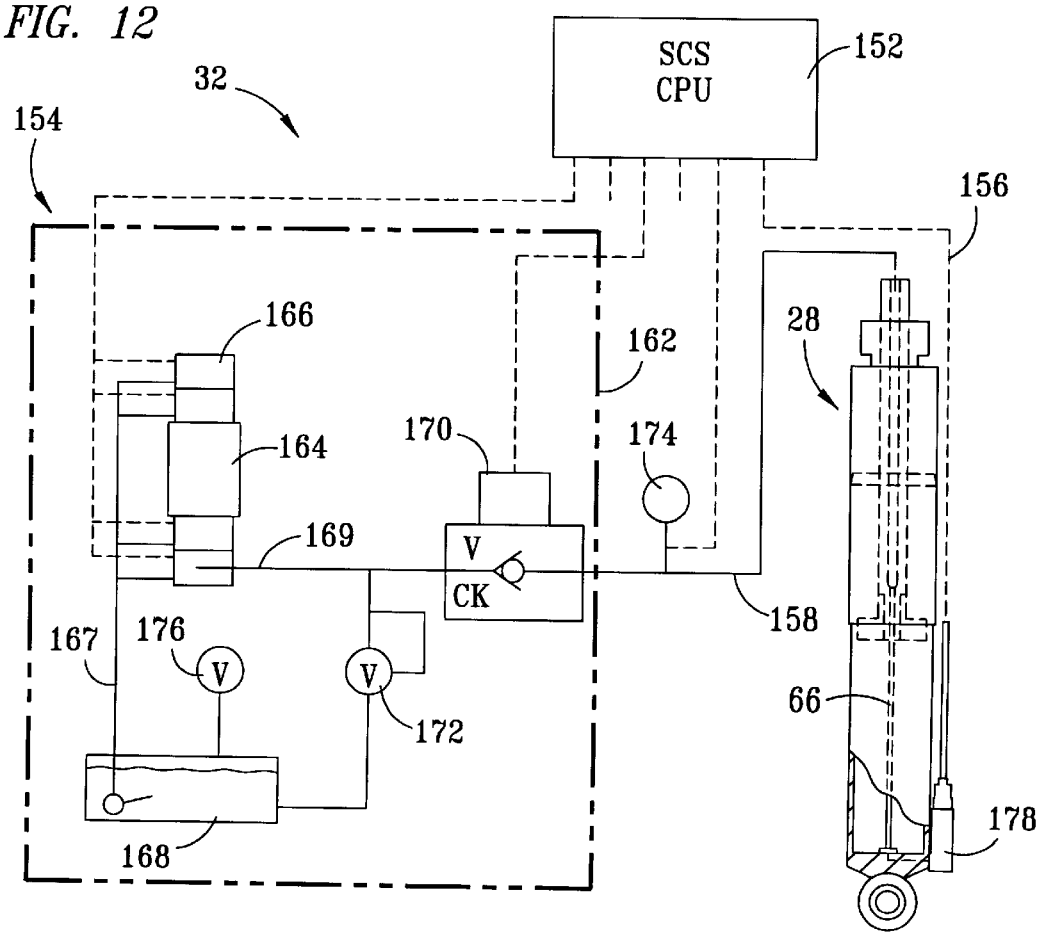
FIG. 12 is a more detailed schematic diagram depicting the hydraulic power system for one of the struts.

FIG. 12 is a schematic diagram of a portion of the suspension system 20, showing the control unit 32 for operating one of the struts 28. The charge system 154 includes a pump unit 162 having a motor 164 and a plurality of pumps 166, one pump for each of the struts 28. Inputs of the pumps 166 are connected by a flow line 167 to a fluid reservoir 168 and have outputs which are connected by flow lines 169 to a control valve 170 corresponding to each of the struts 28. The flow line 158 connects from the control valve 170 to the input of the strut 28. A safety relief valve 172 is provided for connecting from the discharge of the pumps 164 to the reservoir 168. A pressure sensor 174 connects to the CPU 152 for providing pressure input to the CPU 152. A vent valve 176 is provided for the reservoir 168. A sensor output connector 178 is provided for connecting the relative position sensor 66 to an input of the CPU 152. A fluid return line 180 connects between the control valve 170 and the fluid reservoir 168 for selectively returning fluid from the strut 28 to the reservoir 168.

Figure 13:
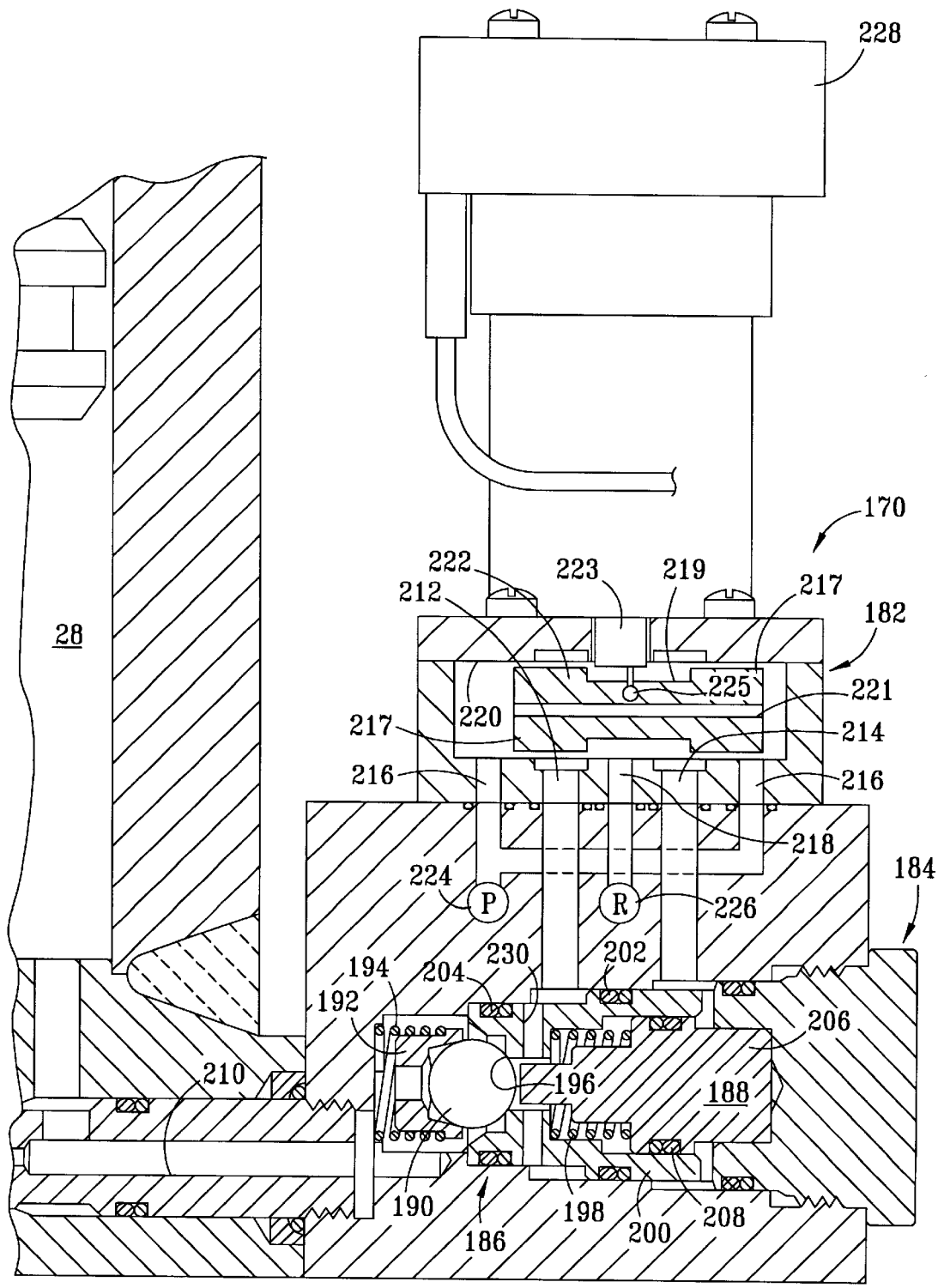
FIG. 13 is a sectional view of a servovalve for the hydraulic control system of FIGS. 11 and 12.

FIG. 13 is a sectional view of a control valve 182 and a pilot operated check valve 184, which may be used together to provide the control valve 170 of FIG. 12. In FIG. 13, the control valve 170 is mounted directly to the strut 28, rather than being remote from one of the struts 28 shown in FIG. 12. The pilot operated check valve 184 includes a check valve section 186 and a pressure release actuator section 188. A ball 190 provides a valve member secured by a retainer member 192 and urged by bias spring 194 to engage a ball seat 196. The ball seat 196 is provided by a forward portion of a piston sleeve 200. The piston sleeve 200 has a seal 202 and a seal 204 which are of different sizes. The seal 204 being smaller than the seal 202. An actuator piston 206 extends in a rearward portion of the piston sleeve 200 and has a seal 208. A supply port 210 connects the pilot operated check valve 184 to the interior cylinder of one of the struts 28. In the embodiment of FIG. 12, in which the valves 182 and 184 are not mounted directly to the strut 28, the valve 184 is connected to the supply port 210 by a fluid line 158.

A flow port 212 and a flow port 214 extend between the chamber 220 of the control valve 182 and the pilot operated check valve 184. The supply ports 216 are connected to a pressurized fluid supply port 224. The exhaust port 218 is connected to exhaust to a fluid return port 226. In the embodiment of FIG. 12, the fluid supply port 224 is connected to the flow line 169, and the fluid return port 226 is connected to the flow line 167 of FIG. 12. Preferably, in the embodiment of FIG. 13, the flow ports 212 and 214 are spaced apart at their respective entry points into the chamber 220. The entrance of the two supply ports 216 into the chamber 220 are disposed on opposite sides of the flow ports 212 and 214. The entrance of, that is the entry point, of the exhaust port 218 into the chamber 220 is centrally disposed between the two flow ports 212 and 214, and is also centrally disposed between the two supply ports 216.

A spool 222 is disposed in the chamber 220 and is selectively positional by operation of an electric control actuator 228. The chamber 220 is preferably of a cylindrical shape. The spool 222 is also preferably of a generally cylindrical shape, with two enlarged cylindrical ends, or lobes, 217 disposed on opposite longitudinal sides of an interconnecting, cylindrically shaped, central portion 219. A flow port 221 extends through the longitudinally through the spool 222 to equalize pressure on opposite sides longitudinal ends of the spool 222. Preferably, the lobes 217 are sized for fitting against the interior of the chamber 220, such that fluid flow is prevented therebetween. The smaller diameter of the central portion 219 provides a flowpath between the two lobes 217. The spool 222 may then be selectively positioned to position selective ones of the two lobes 217 and the central portion 219 between the two supply ports 216 and respective ones of the flow ports 212 and 214, and between the exhaust port 218 and respective ones of the flow ports 212 and 214.

Preferably the electric control actuator 228 is a provided by a selectively positionable electric, rotary motor, which is rotated to move an eccentric member 223 that is mounted directly to the shaft of the rotary motor. Movement of the eccentric member 223 positions a toggle arm 225 into one of three positions to selectively position a spool 222 in a supply position, which is to the right of that shown, an exhaust position, which is to the left of the position shown, and in a neutral position, as shown in FIG. 13. Such an actuator 228 and a control valve 182 combination may be provided by a Model 27 A R-DDV servovalve available from HRTEXTRON, of Valencia, Calif. In other embodiments, a solenoid valve, or the like, may be used.

In operation, to increase the amount of the compressible fluid 42 within the strut 28, the selectively controlled actuator 228 will position the spool 222 to the right of the position shown in FIG. 13. Then, the exhaust port 218 will be connected to the flow port 214 for providing low pressure on the back side of the actuator piston 206 and the back side of the piston sleeve 200. Pressure from the pressure supply 224, which is connected to the flow ports 216, will be connected to the flow port 212 and the flow port 230, which applies the pressure from the supply 224 to the forward end of the piston sleeve 200 and to the forward end of the piston 206. The piston 206 will be bottomed out, in the position shown in FIG. 13, since the exhaust 226 is connected to the left side of the seal 208 of the piston 206 and the supply 224 is connected to the right side of the seal 208 of the piston 206. The pressure applied by the supply 224 will be applied through the flow port 212 and to the forward end of the piston sleeve 200, that is, forward of the seal 202 of the piston sleeve 200, while the exhaust 226 is connected to the rearward, or right side as shown in FIG. 13, of the piston sleeve 200. The pressure differential between the supply 224 and the exhaust 226 will move the piston sleeve 200 against the force of the spring 198, over the forward end of the actuator piston 206, such that the forward end of the piston provides a protuberance which unseats the ball 190 from the ball seat 196 formed in the piston sleeve 200. The compressible fluid 42 will then flow from the fluid supply port 224, through the flow ports 216, the chamber 220, the port 212 and the flow port 230, and then through the check valve section 186 and the supply port 210, and into the strut 28. When adequate fluid is applied to the strut 28, then the actuator 228 will move the spool 222 to a position for obstructing flow between the supply port 224 and the flow port 212. The piston sleeve 200 will then be moved by the coil spring 198 to a forward position (not shown), and the pressure is equalized between the flow ports 212 and 214, and the spring 194 will push the retainer member 192 and the ball 190, such that the ball 190 will seat against the ball seat 196.

When pressure is to be released from within the strut 28, the spool 222 will be moved within the chamber 220 to the left of the position shown in FIG. 13, such that the exhaust port 218 is connected in fluid communication with the flow port 212, and such that the supply flow ports 216 are connected to the flow port 214. Connecting the flow port 214 to the supply 224 applies pressure to the back side of the piston sleeve 200 and to the back side of the actuator piston 206. The piston sleeve 200 will remain in the position shown in FIG. 13, engaging an annular-shaped shoulder of the housing of the valve 184. The pressure applied from the supply 224 to the back side of the actuator piston 206 will then push the piston 206 forward such that the forward end of the actuator piston 206 will move through the ball seat 196 to push the ball 190 from seating against the ball seat 196. With the forward end of the piston 206 pushing the ball 190 off the seat 196, the compressible fluid 42 will flow from within the strut 28, will pass through the flow port 210 and into the check valve section 186, between the ball 190 and the seat 196, through the flow port 230 to the flow port 212, then through the exhaust port 218 and the exhaust 226. In the embodiment of FIG. 12, the compressible fluid 42 will flow from the exhaust 226 and through the flow line 180 to the reservoir 168. Once the control unit 152 senses that enough fluid has been exhausted from the strut 28, the electric control unit 228 will move the spool 222 to a neutral position, such as that shown in FIG. 13, such that supply pressure is not applied from the supply flow port 224 to either of the flow ports 212 or 214. The bias spring 198 will then urge the actuator piston 206 back to a rearward position, and the spring 194 will urge the retainer 192 to push the ball 190 against the ball seat 196 on the forward end of the piston sleeve 200.

Preferably, the bias springs 194 and 198 are sized to provide a fail-safe mode if the control valve 170 is no longer operational, in which the strut 28 will operate in a passive mode. In such a passive mode, the amount of the compressible fluid 42 within the strut 28 will remain constant. The bias spring 198 will preferably push the piston sleeve 200 apart from the actuator piston 206, such that the all seat 196 will remain forward of the forward end of the piston 206. The bias spring 194 will preferably push the retainer 192 rearward, to the left in FIG. 13, to push the ball 190 onto the seat 196, sealing the compressible fluid 42 within the strut 28. In some embodiments, the compressible fluid 42 may be exhausted from the strut 28 when high pressures are encountered in the strut 28, by providing a spring 198 which can be overcome by the high pressures being applied to ball 190 and the forward-most end of the piston sleeve 200.

Figure 14:
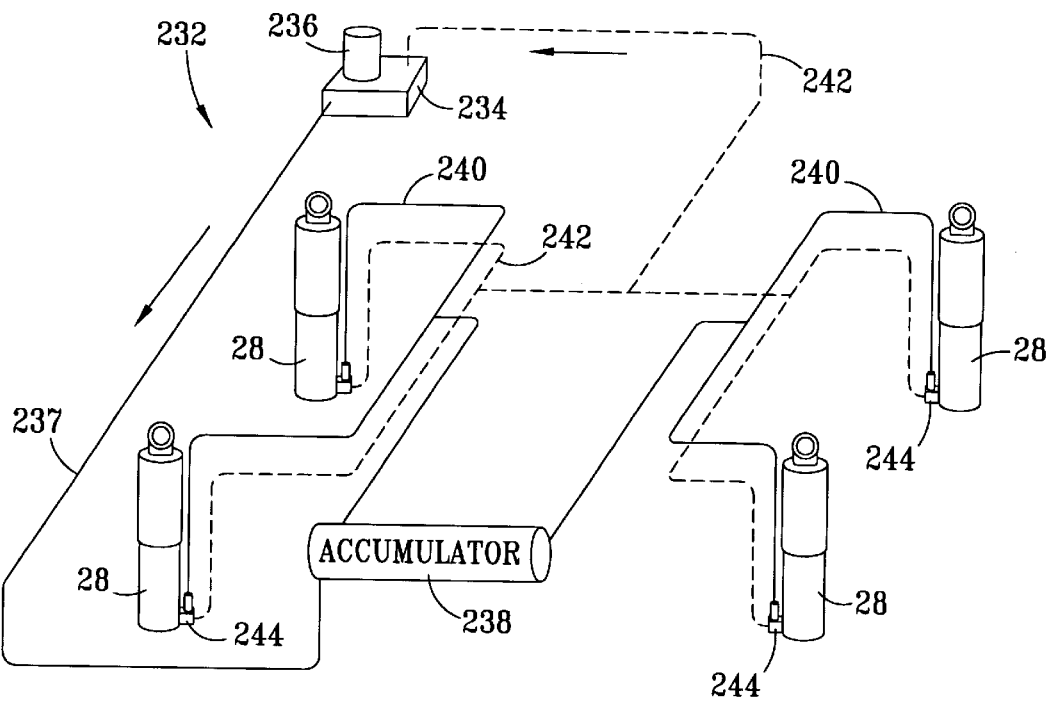
FIGS. 14 is a schematic diagram of an alternative suspension system having struts containing compressible fluids.

FIG. 14 is a schematic diagram which illustrates an alternative embodiment of a hydraulic control unit 232 of a suspension system made according to the present invention. A reservoir 234 is connected to a pump unit 236. The pump unit 236 has an output connected by a flow line 237 to a pressure accumulator tank 238. Supply lines 240 connect from the accumulator tank 238 to control valves 244, which are mounted directly to the struts, as shown in FIG. 13. One of the control valve 244 is mounted to each of the various struts 28. Return lines 242 connect fluid discharged from the struts 28 by the control valves 244 to the reservoir 234. The control valves 244 are selectively operated to pass compressible fluid from the accumulator tank 238 to respective ones of the struts 28, such that each of the struts 28 will provide a desired force output and be of a selected length.

Figure 15:
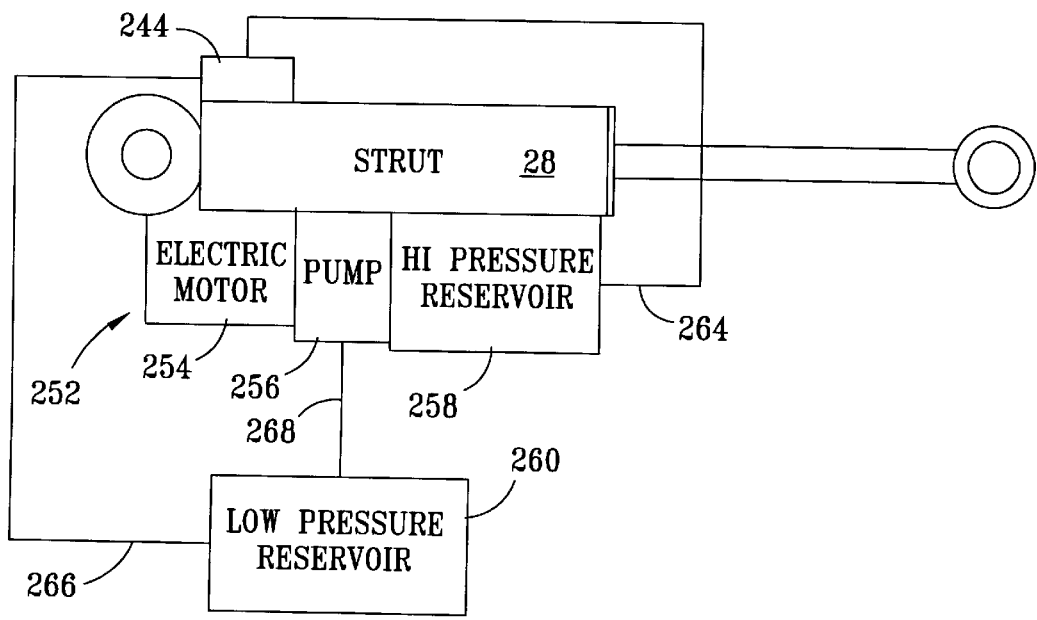
FIGS. 15 and 16 are schematic diagrams of a second alternative suspension system.

FIG. 15 is a side elevational view of an alternative power unit 252 mounted directly to one of the struts 28. The power unit 252 includes a pump 256 and a high pressure reservoir 258. A motor 254 is secured to the pump 256 and powers the pump 256 to pressurize fluid in the high pressure reservoir 258. A control valve 244 then supplies pressurized fluid from the flow line 264 to the strut 28. A return line 266 connects the control valve 244 to a low pressure reservoir 260. A flow line 268 connects the low pressure reservoir 260 to the pump 256.

Figure 16:
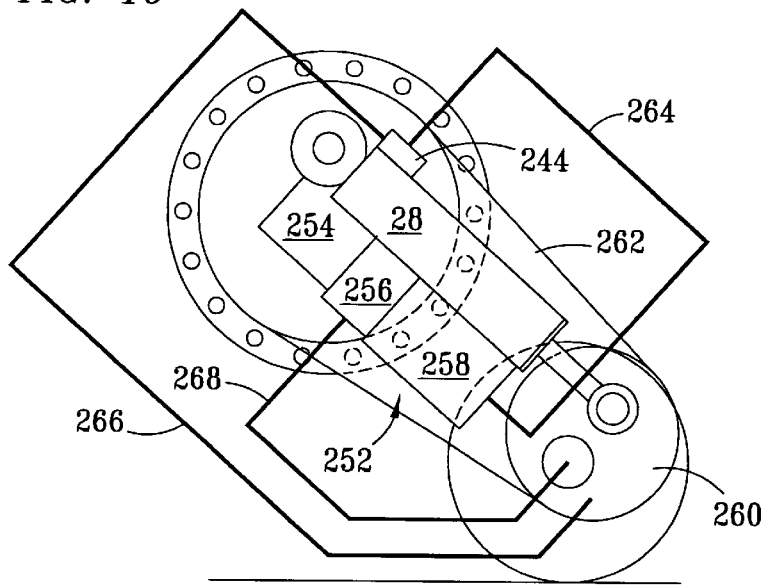

FIG. 16 is a side elevational view showing the power unit 252 and the strut 28 mounted to a suspension arm 262. At one end of the suspension arm 262 is a pressure reservoir 260. When fluid is discharged from within the cylinder of the strut 28 by a control valve 244, the fluid is passed to the low pressure reservoir 260 for storage until the pump 256 pressurizes such fluid and passes it to the high pressure reservoir 258.

Figure 17:
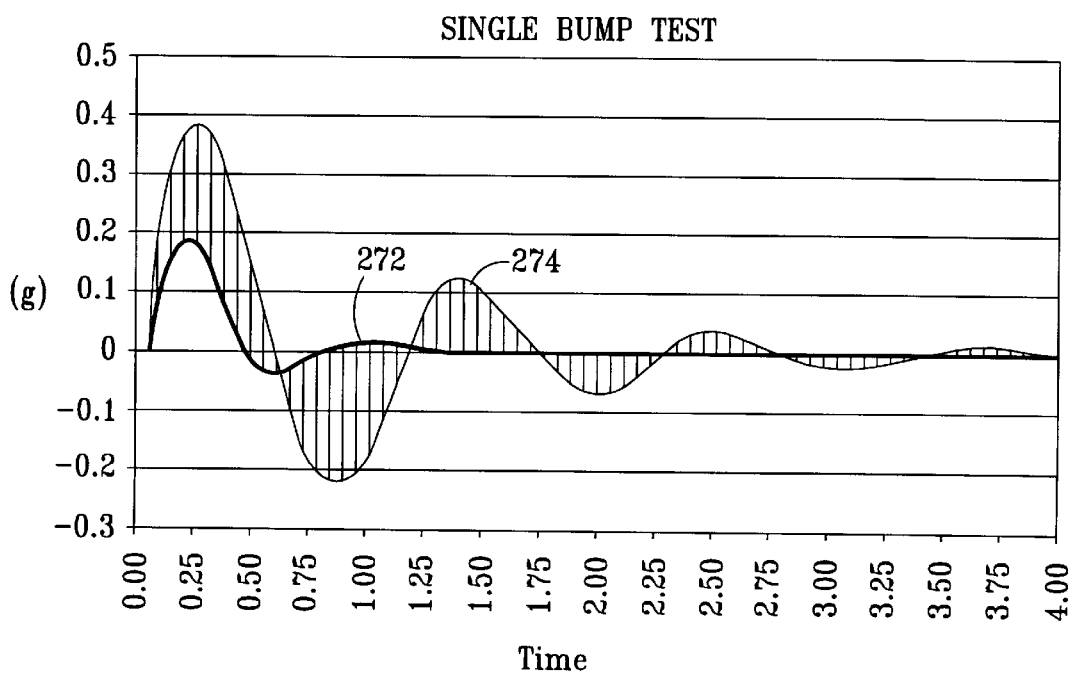
FIG. 17 is a graph depicting operation of the suspension system having struts which contain a compressible fluid.

FIG. 17 is a graph of displacement versus time showing a curve 272 for one of the struts 28 in response to a single impact force, such as a jounce, as compared to a curve 274 for a normal coil spring and separate dampener type of suspension. The curve 272 shows the motion of the strut 28 greatly diminished to almost imperceptual motion after one cycle. The curve 274 shows approximately three cycles before the motion of the conventional coil spring and separate damper attenuates an initial force to that was attenuated by the strut 28 of the present invention after one cycle of motion.

Figure 18:
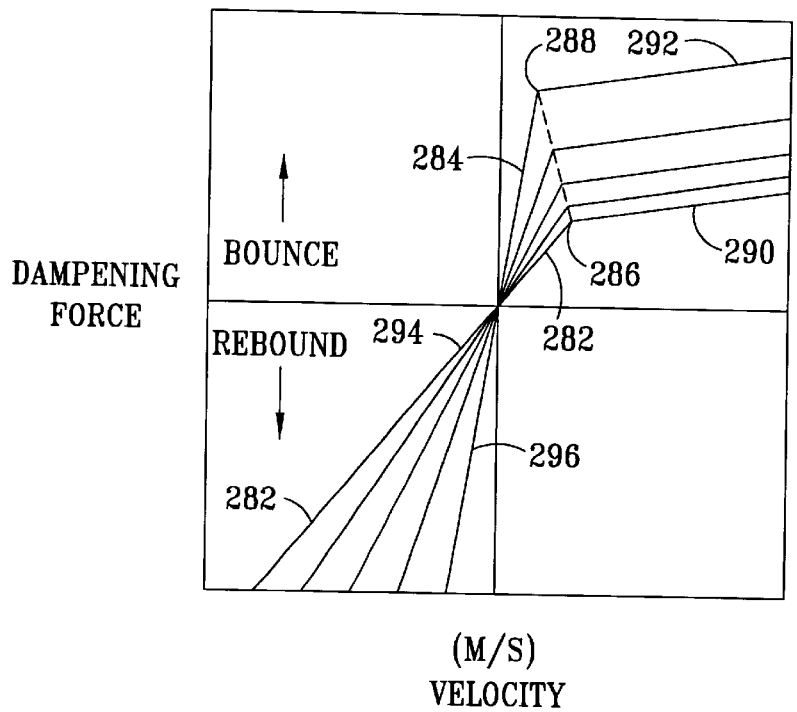
FIG. 18 is a graph of dampening performance for operation of a strut having a damper piston which includes a dual position valving assembly.

FIG. 18 is a graph of dampening force verses velocity of a strut 28 having a dual position valve element 118 in a damper piston 44. Velocity is shown in meters per second. The lower left quadrant shows rebound and the upper right quadrant shows bounce. Two slopes of the curves 284 and 282 show two different velocities of movement of the damper element 44 within the compressible fluid of the cylinder 34 of the strut 28. At the upper portion, or higher velocity portion, of the bounce portions, break points 286 and 288 occur. This is where the inner damper element 118 moves off of the seat 124 and allows increased flow through the second flow path 112. (Shown in FIG. 7). This provides dual rate directional dampening in additional to initial control dampening. Thus, there is greater dampening on the rebound stroke than in the higher velocity portion of the bounce, or jounce. The less dampening on the jounce allows more of the impact energy to be absorbed over a longer period of time to soften the blow of the impact forces.

Figure 19:
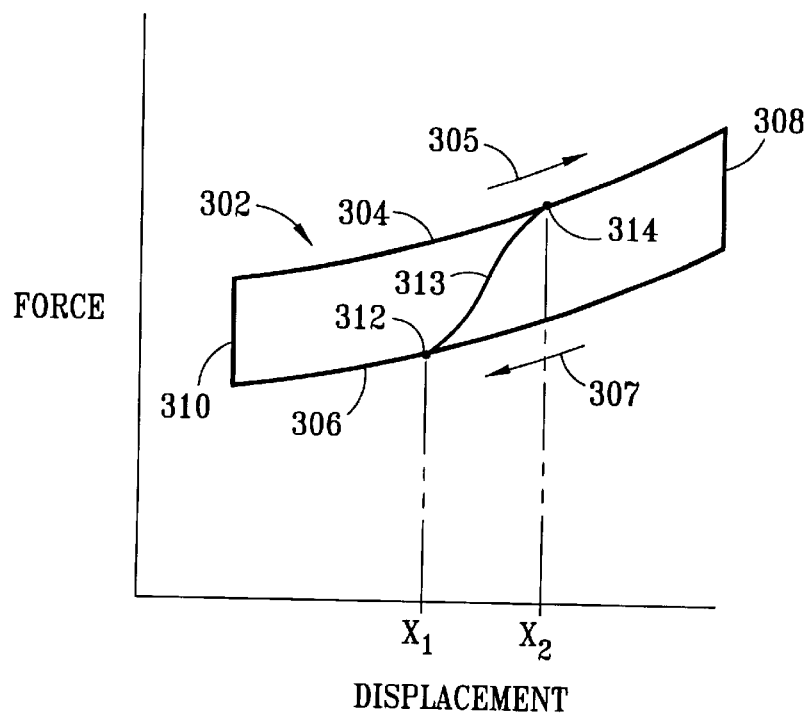
FIG. 19 is a graph of various operational states of a strut containing a compressible fluid.

FIG. 19 is a plot 302 of force versus displacement for one of the struts 28. A jounce stroke 304, in the direction 305, and bounce cycle 306, in the direction 397, are shown. The offsets 308 and 310 correspond to the initial control dampening and movement of the damper element. Movement along the curve 313 from point 312 to a point 314 illustrates pressure being increased by more fluid being pumped into the cylinder of the strut 28. The addition of more fluid within the cylinder shifts the performance curve 302 upward from the ride height $X_1$, at a point 312, to the ride height $X_2$, at a point 314, in the performance curve 304. This will be discussed in more detail below, in reference to FIG. 23.

Figure 20:
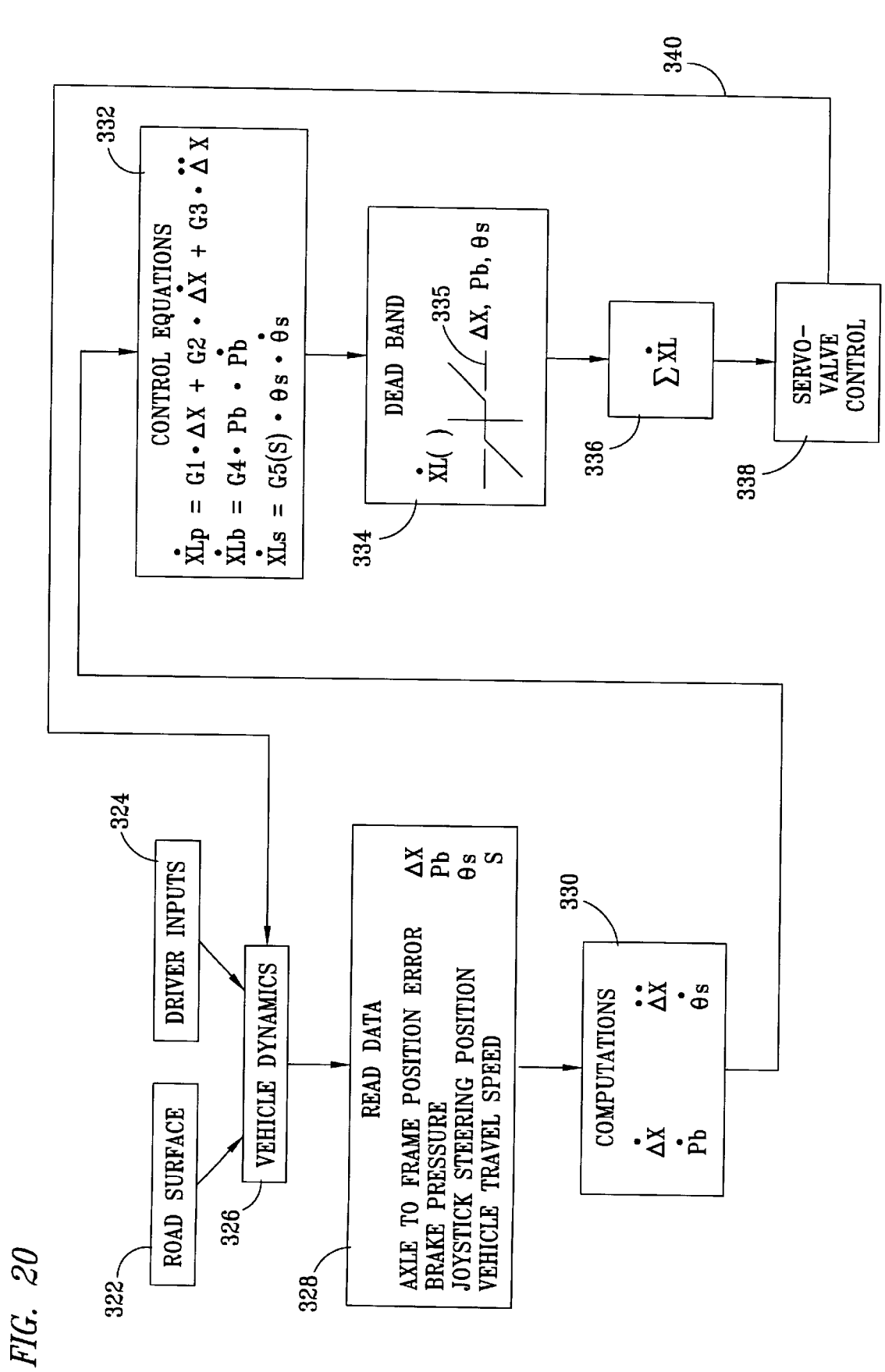
FIG. 20 is a flowchart of operation of a suspension control system.

FIG. 20 is a flowchart illustrating a control schematic for operation of a suspension system of to the present invention. The varying levels of a road surface 322 and driver selected inputs 324 are combined with the vehicle dynamics 326 to determine the various positional, or ride, parameters in step 328. Computations are performed in step 330 to determine various ones of the vehicle positional parameters. The vehicle ride parameters are then applied to control equations in step 332 to determine control parameters, which are compared in the step 334 to a dead band range 335 to determine whether the suspension system will react passively or in an active mode. If the control parameters are of values which are either above or below the dead band range 335, the active control system will apply control parameters to the summation unit 336, which applies the sum of the various control parameters to the a strut servovalve 338, which either removes or adds compressible fluid to the strut 28. If control parameters are in the dead band range 335, the system will react passively; that is, the amount of fluid in the strut 28 will remain the same. A feedback loop 340 applies sensed parameters as feedback into the vehicle dynamics input 326.

Sprung mass motions below the wheel frequency can be mitigated by using skyhook dampening, or by rolling off, or reducing, the spring constant at low frequencies. Rolling off, or reducing, the dampening constant at high frequencies can easily mitigate motions above the wheel frequency. Such reductions in the spring and dampening coefficients may be accomplished by frequency-dependent filtering of spring and dampening coefficients for active suspension control through both an outer control loop, which generates the target strut forces, plus an inner force control loop, which compares the actual vehicle ride height, position and velocity data to a reference datum, defined herein as a skyhook reference.

Figure 21:
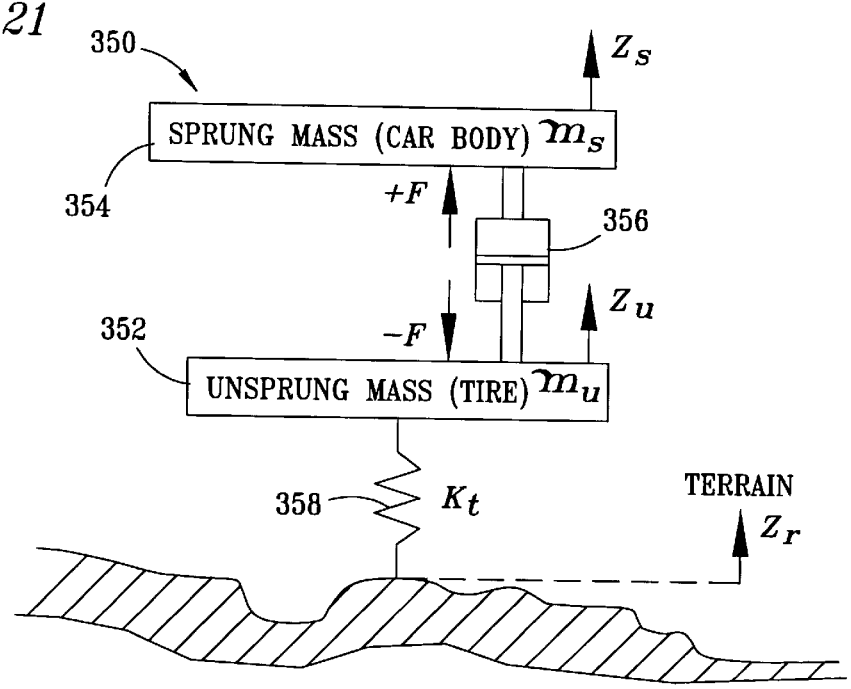
FIG. 21 is a schematic diagram depicting a theoretical model for calculating various operational parameters for a strut containing a compressible fluid.

FIG. 21 is a theoretical model of a one-quarter vehicle active suspension system 350 which represents a single wheel 352 of a vehicle. The wheel 352 and an axle connected to one-quarter portion of the car body 354 through an active hydraulic strut 356. The wheel 352 comprises a tire which is modeled as a simple spring 358 without dampening. The equations of motion for this system are given as $$m_s \ddot{z}_s + m_s g - F = 0 \quad (1)$$

$$m_u \ddot{z}_u + m_u g + K_t(z_r - z_u) + F = 0 \quad (2)$$

where $m_s$ and $m_u$ are the masses of car body 354 (sprung mass) and wheel 352 [unsprung mass], $z_s$ and $z_u$ are the respective displacements of the car body 354 and the wheel 352, g is gravitational acceleration, $K_t$ is the spring constant of the tire 352, $z_r$ is the terrain input disturbance, and F is the force produced by the active hydraulic strut 356.

Figure 22:
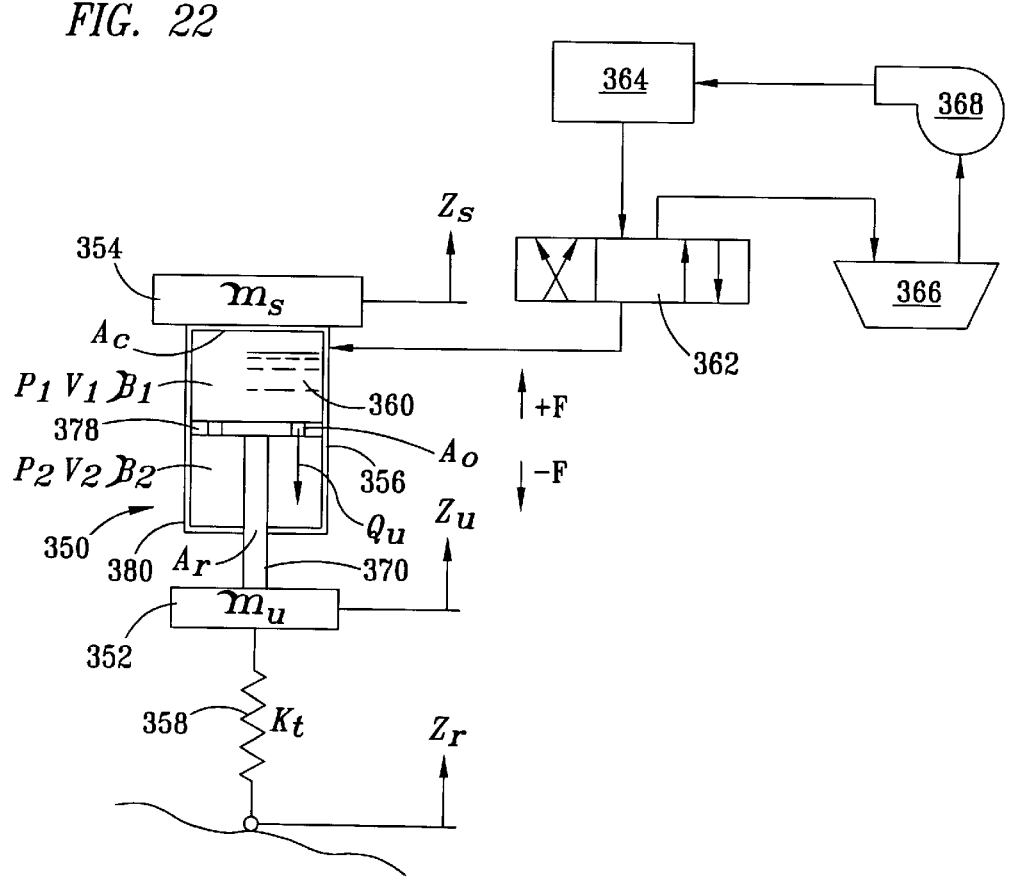
FIG. 22 is a schematic diagram depicting a model of a one-quarter vehicle, strut suspension system.

FIG. 22 is a more detailed view of the model of the one-quarter vehicle active control system 350 for a suspension system which incorporates the active hydraulic strut 356 containing a compressible fluid 360, such as the strut 28 in FIGS. 6 or 7. The strut 356 allows for active adjustments in spring and dampening rates to maintain effective use of the full strut travel while accommodating variations in vehicle weight. The operating fluid 360 inside the strut 356 is a special compressible fluid, which when compressed, acts as a potential energy storage element. A piston 370, actually provided by the rod 370 and not the damper member 378, extends into a cylinder 380 to displace and compress the compressible fluid 360 within the cylinder 380. A damper member 378 is mounted to the end of the piston 370. The strut 356 can replace the two components of a conventional mechanical spring and dashpot suspension system. The strut 356 does not require any hydraulic fluid flow in order to comply with load input and shock impulses, thereby providing a faster spring response than conventional active strut systems, in which substantially incompressible hydraulic fluid is pumped into or out of a hydraulic strut members in response to variations in terrain. Additionally, since the vehicle rides on a column of compressible fluid 360, the strut 356 provides high frequency vibration isolation with an approximate effectiveness in the 25 Hz range to minimizes the terrain disturbance transmitted directly from the tires 352 to the vehicle frame 354.

The strut 356 works on a simple volume-displacement method to provide a compact spring function under boh static (non-active) and dynamic (active) operating conditions. The static spring force function provides force F which suspends the vehicle 354 at desired ride height, while the dynamic spring force function provides an advantageous rising-rate spring curve characteristic which reduces vehicle body roll and pitch without the steep spring rates of conventional hydraulic systems. Active force control in the strut 356 is achieved by varying the mass of the compressible fluid 360 inside the cylinder 380 of the strut 356. The strut force F generated by the strut 356 can be varied by a servo control valve 362, which feeds compressible hydraulic fluid 360 between an accumulator 364 and the strut 356. A pump 368 pumps fluid 360 from a reservoir 366 to the accumulator 364.

Figure 23:
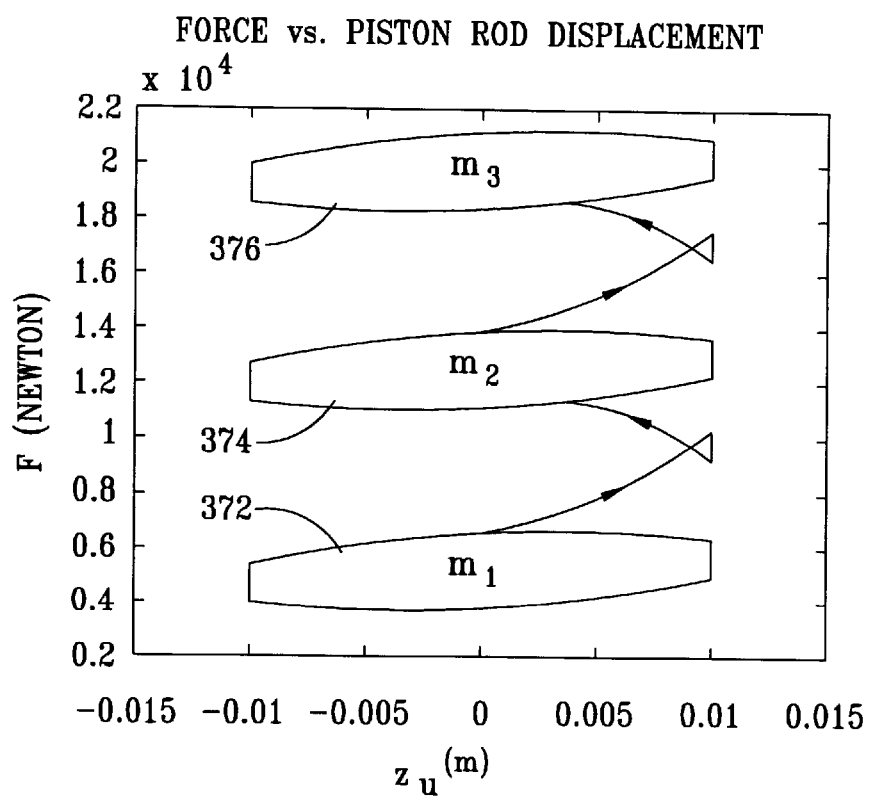
FIG. 23 is a graph depicting various spring rate constants according to fluid pressures applied to the strut containing a compressible fluid.

FIG. 23 is a graph obtained through simulations of the change in force F generated by the strut 356 versus displacement of the piston 370 ($z_u$) as additional fluid 360 is pumped into or removed from within the cylinder 380 of the strut 356. In experimentally determining this graph, the strut cylinder 380 was fixed while the strut piston 370 was given a sinusoidal disturbance. The mass of the compressible fluid 360 was increased by pumping the fluid 360 into the chamber 380 at three separate instances (i.e., $m_3 > m_2 > m_1$). This caused the force versus displacement curve to shift upward from region 372 ($m_1$), to region 374 ($m_2$), and then to region 376 ($m_3$). Reduction of the strut force F can be obtained by discharging the fluid 360 from the cylinder 380 of the strut 356. A magnitude change in strut force F translates into a change in the static and dynamic spring constant characteristic of the strut 356. Active force control combined with the strut 356 will be able to affect such functions as basic load leveling, ride height control and gross vehicle motion control.

The dampening function of the strut 356 is preferably provided by a special single-element damper arrangement comprising a piston 378 which is disposed within the strut 356 Fluid flow through ports in the dampening piston 378 is restricted as the rod 370 is displaced in and out of the cylinder 380 to provide dampening resistance to motion. This is analogous to adjusting the leakage flow through the area $A_o$ of ports in the piston 378 (shown in FIG. 22). The strut 356 includes integral dampening and allows for the rejection of heat in dynamic operation to allow continuous high performance dampening rates without dampening fade, cavitation, seal leakage or temperature related performance and such other reliability problems which often plague conventional dampening systems. Improved fast response and dampening power of the strut reduces the magnitude and frequency of impact and transmittal forces absorbed by the vehicle frame as compared to that which occurs with conventional two component spring and damper suspension systems.

The dynamic equations for the strut 356 are given as $$\dot{P}_1 = \beta_1 \left( \frac{Q - Q_L - A_c(\dot{z}_s - \dot{z}_u)}{V_{o1} + A_c(z_s - z_u)} \right), \text{ and} \tag{4}$$

$$\dot{P}_2 = \beta_2 \left( \frac{Q_L + (A_c - A_r)(\dot{z}_s - \dot{z}_u)}{V_{o2} - (A_c - A_r)(z_s - z_u)} \right), \tag{5}$$

where $P_1$ and $P_2$ are the pressures in chambers 1 and 2, which are defined by opposite sides of the cylinder 380, and $A_c$ is the strut cylinder surface area. $A_r$ is surface area of the piston rod 370, $A_o$ is the piston hole surface area, and $V_{o1}$ and $V_{o2}$ are the initial volumes in chambers 1 and 2. The compressible fluid flow between the accumulator 364 and the strut 356 is modeled by the servovalve equation given by $$Q = C_d w x_v \sqrt{2|P_a sat(x_v) - P_1|/\rho}, \tag{6}$$

where $C_d$ is the fluid discharge coefficient, p is the fluid density, w is the servo valve area gradient, $P_a$ is the pressure in the accumulator 364 (assumed to be constant) and $x_v$ is the servovalve 362 displacement from its "closed" position. The control input is taken as $x_v$. The saturation function sat(x) is defined as $$sat(x) = \begin{cases} 1 & x > 0 \\ 0 & x \leq 0 \end{cases}. \tag{7}$$

$Q_L$, the orifice fluid flow through the piston hole area $A_o$, is computed as $$Q_L = C_d A_o sgn(P_1 - P_2) \sqrt{2|P_{1-P_2}|/\rho}, \tag{8}$$

where $C_d$ is the fluid discharge coefficient and $\rho$ is the fluid density.

$\beta_1$ and $\beta_2$ are the bulk moduli for the fluid in chambers 1 and 2, and are given by $$\beta_i(P_i) = 171617.03249\sqrt{1 + (7.718658 \times 10^{-5} P_i)^2} \, i = 1, 2 \tag{9}$$

The relationship defined in Equation (9) was derived from analysis of experimental data acquired in Applicant's laboratories.

For the full state model, the states are assigned as $$x_1 = z_s, \, x_2 = \dot{z}_s, \, x_3 = z_s - z_u, \, x_4 = \dot{z}_u, \, x_5 = P_2, \, x_6 = P_1.$$

The control is $u_1 = x_v$. The road disturbance is $u_2 = z_r$. Combining Equations (1)–(9) results in the system state equations below:

$\dot{x}_1 = x_2$ $\dot{x}_2 = 1/m_s(-m_s g + F)$ $\dot{x}_3 = x_2 - x_4$ $\dot{x}_4 = 1/m_u(-m_u g + K_1(u_2 - x_1 + x_3) - F)$ (10)

$\dot{x}_5 = \beta_2 \left( \frac{Q_L + (A_c - A_r)(x_2 - x_4)}{V_{o2} - (A_c - A_r)x_3} \right)$ $\dot{x}_6 = \beta_1 \left( \frac{Q - Q_L + A_c(x_2 - x_4)}{V_{o1} + A_c x_3} \right)$ $y = F = A_c x_6 - (A_c - A_r)x_5$ where:

$Q = C_d w u_1 \sqrt{2|P_s sat(u_1) - x_6|/\rho}$ $Q_L = C_d A_o sgn(x_6 - x_5)\sqrt{2|x_6 - x_5|/\rho}$, (11)

$\beta_1 = 171617.03249\sqrt{1 + (7.718658 \times 10^{-5} x_6)^2}$ $\beta_2 = 171617.03249\sqrt{1 + (7.718658 \times 10^{-5} x_5)^2}$ The values for the system parameters shown below were selected as:

$m_s = 290[kg]$  $A_c = 5.35225 \times 10^{-3}[m^2]$

| | |
|---|---|
| $m_u = 59[kg]$ | $A_o = 3.35483 \times 10^{-4}[m^2]$ |
| $K_1 = 190000[N/m]$ | $A_r = 3.87741 \times 10^{-4}[m^2]$ |
| $C_d = 0.7$ | $\rho = 970[kg/m^3]$ |
| $w = 1.43633 \times 10^{-2}[m^2]$ | $P_a = 34473789.5[Pa]$. |

Figure 24:
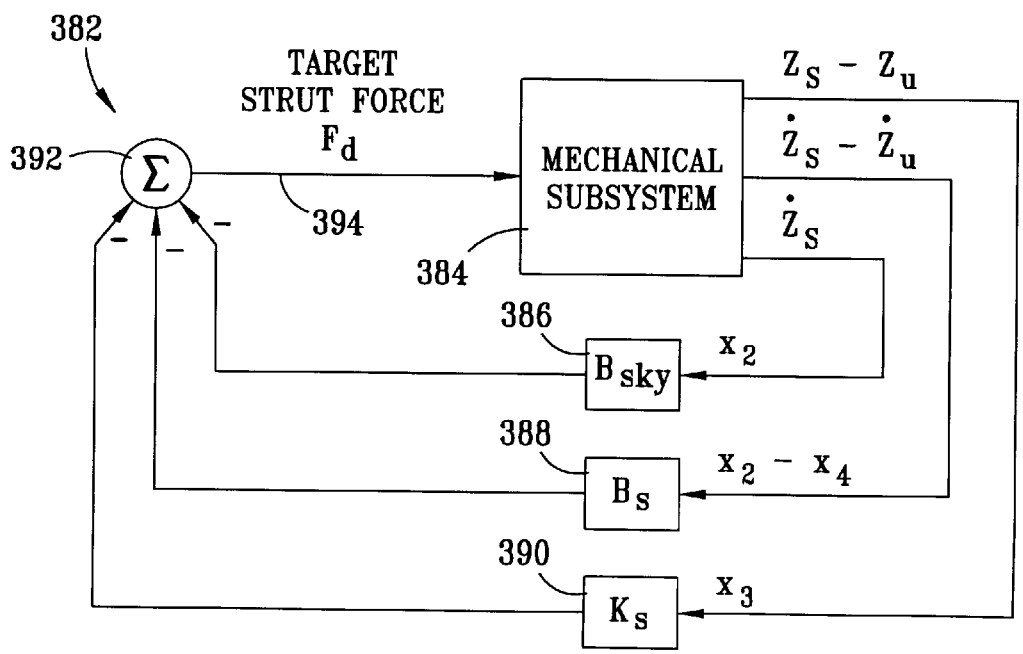
FIG. 24 is a schematic diagram of an initial target force feedback loop for operating a strut suspension system having struts which contain a compressible fluid.

FIG. 24 is a schematic diagram of a first feedback control system loop 382 for a suspension system of the mechanical subsystem of a quarter vehicle which does not include the dynamics of a strut. The feedback loop system determines an ideal target force to be applied by a strut in such a suspension system. A proportional-integral (PI) force controller is applied in a second feedback control loop to generate the ideal target force by controlling the hydraulic servovalve that produces a fluid flow to dispense a controlled amount of fluid (Q) within a strut. For a mechanical subsystem of a quarter-vehicle (states $x_1$ through $x_4$), the ideal target strut force is given by the equations:

$F_d = K_s(z_s - z_u) - B_s(\dot{z}_s - \dot{z}_u) - B_{sky}\dot{z}_s = -K_s x_3 - B_s(x_2 - x_4) - B_{sky} x_2$, (13)

where $K_s$ is the passive spring constant, $B_s$ is the passive dampening constant and $B_{sky}$ is the skyhook dampening constant.

Figure 25:
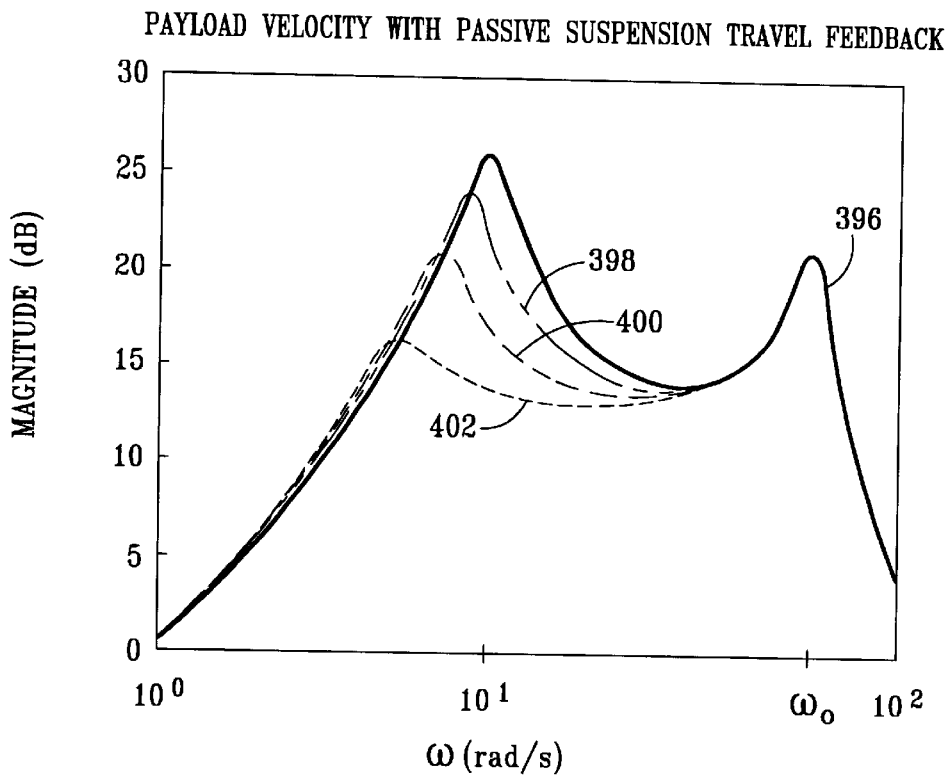
FIG. 25 is a graph depicting the effect of varying the passive spring constant of a strut of a suspension system by varying the amount of compressible fluid located in a cylinder of the strut.

The effect of increasing the passive spring constant $K_s$ is shown in the Bode plot of FIG. 25. The Bode plot is taken from road disturbance to payload vertical velocity $\left| \frac{X_2(j\omega)}{U_2(j\omega)} \right|$ for $K_s=0$ (no feedback) (solid line 396), $K_s=4000$ NB/m (dotted line 398), $K_s=8000$ N/m (dashpot line 400), and $K_s=12000$ N/m (dashed line 402). Suspension travel $x_3$ is easily measured using a Linear Variable Differential Transformer (LVDT) integrated with the strut. Passive suspension travel feedback improves ride velocity at the car body vibration frequency (the left-hand peak in FIG. 23) and also between the body vibration frequency and wheel frequency $\omega_o$, but has little effect above the wheel frequency. The wheel vibration frequency can be approximately computed as $\omega_0 = \sqrt{\frac{K_t}{m_u}}$ (14)

Figure 26:
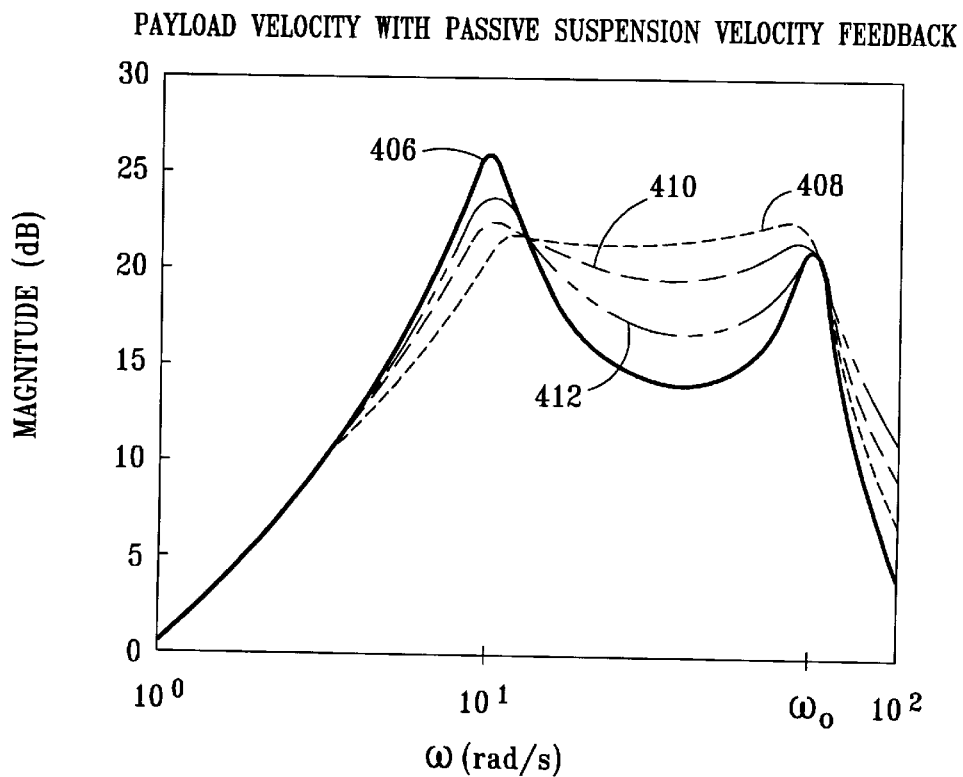
FIG. 26 is a graph depicting the effect of varying the passive dampening constant of a strut containing compressible fluid, by varying the amount of the compressible fluid located in the cylinder of the strut.

The effect of increasing the passive dampening constant $B_s$ is shown in FIG. 26. The Bode plot is taken from road disturbance to payload vertical velocity $\left| \frac{X_2(j\omega)}{U_2(j\omega)} \right|$ for $B_s=0$ (no feedback), (solid line 406), $B_s=500$ N/m/sec (dotted line 408), $B_s=1000$ N/m/sec (dashpot line 410) and $B_s=2000$ N/m (dashed line 412). Suspension velocity is easily computed by taking the difference between sprung mass velocity $x_2$ and unsprung mass velocity $x_4$. Accelerometers may be used to measure sprung mass and unsprung mass accelerations, which are passed through filtered integrals to obtain their respective velocities. Passive suspension velocity feedback improves ride velocity at the car body vibration frequency but worsens it between the body vibration frequency and the wheel frequency, and also above the wheel frequency $\omega_o$.

Figure 27:
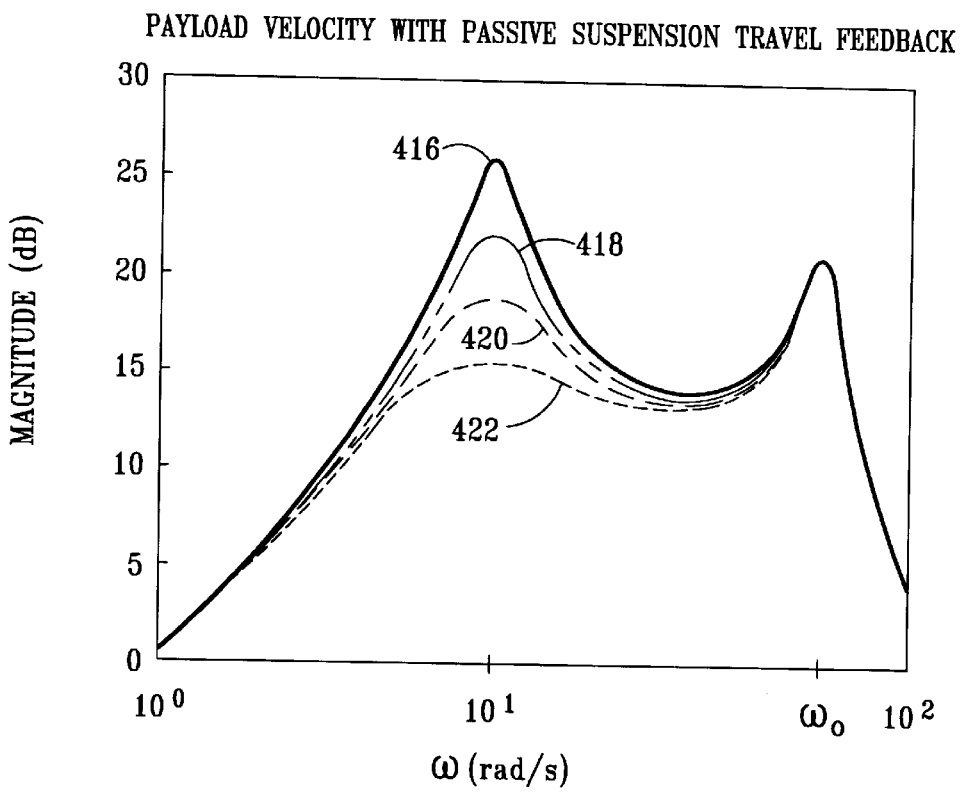
FIG. 27 is a graph depicting the effect of varying the amount of compressible fluid within a strut to effect a skyhook dampening coefficient for a suspension system.

FIG. 27 is a Bode plot which shows the effect of increasing skyhook dampening constant $B_{sky}$. Skyhook dampening is a term used herein to describe feedback of the absolute velocity of the car body $x_2$, such as that which is determined from measurements taken from an accelerometer mounted on the body of the vehicle in determining the strut spring rate and dampening coefficients. The Bode plot is taken from road disturbance to payload vertical velocity $\left| \frac{X_2(j\omega)}{U_2(j\omega)} \right|$ for $B_s=0$ (no feedback),( solid line 416), $B_{sky}$.500 N/m/sec (dotted line 418), $B_{sky}=1000$ N/m/sec (dashpot line 420) and $B_{sky}=2000$ N/m/sec (dashed line 422). Skyhook dampening improves ride velocity at all frequencies below the wheel frequency $\omega_o$.

The plots for varying the spring constant $K_s$, the dampening constant $B_s$, and the skyhook dampening $B_{sky}$ illustrate that vibration at the wheel frequency $\omega_o$ cannot be improved by any control force that is only applied between the car body and the wheel. Since selecting the wheel frequency as the input places a zero near the wheel frequency $\omega_o$, resulting in an uncontrollable mode due to effective pole-zero cancellation. However, increasing $K_s$ below $\omega_o$ or decreasing $B_s$ above $\omega_o$ improves performance, although increasing $K_s$ above $\omega_o$ has no effect on performance, and increasing $B_s$ degrades performance between $\omega_o$ and the body vibration frequency.

It is possible to improve performance both above and below wheel frequency $\omega_o$ by either gradual or graduated decreases in the dampening constant $B_s$ above $\omega_o$ and by either gradual or graduated decreases in the spring constant Ks below $\omega_o$, a term which is herein defined as rolling off of such respective dampening constants. This cannot be done using passive feedback, but is possible with a strut which may be configured to incorporate into one device all three features of a damper, a spring, and an active suspension strut. To provide the rolling off decreases in $B_s$ at high frequency, a low pass filter (LPF) is defined by the equation:

$$\bar{x}_{24} = \frac{\omega_b}{s+\omega_b}(\dot{z}_s - \dot{z}_u) = \frac{\omega_b}{s+\omega_b}(x_2 - x_4), \quad (15)$$

where $\omega_b$ selected frequency at which reduction in the dampening constant $B_s$ begins.

This can be realized by adding the state equation $$\dot{\bar{x}}_{24} = -\omega_b \bar{x}_{24} + \omega_b(x_2 - x_4). \quad (16)$$

To provide the rolling off decreases in the spring constant $K_s$ of the strut at low frequencies, a high pass filter (HPF) may be defined by the equation $$x_{sw} = \frac{s}{s+\omega_k}x_3, \quad (17)$$

where $\omega_o$ is the selected frequency at which reductions in the spring constant $K_s$ begin. Note that $x_3 = z_s - z_u$. To realize the HPF as a state system, the following equation may be used $$x_{3W} = \frac{s}{s+\omega_k}x_3 = \left(1 - \frac{\omega_k}{s+\omega_k}\right)x_3. \quad (18)$$

with an additional state defined as $$\dot{\bar{x}}_3 = -\omega_b \bar{x}_3 + \omega_k x_3$$

$$x_{3W} = x_3 - \bar{x} \quad (19)$$

Figure 28:
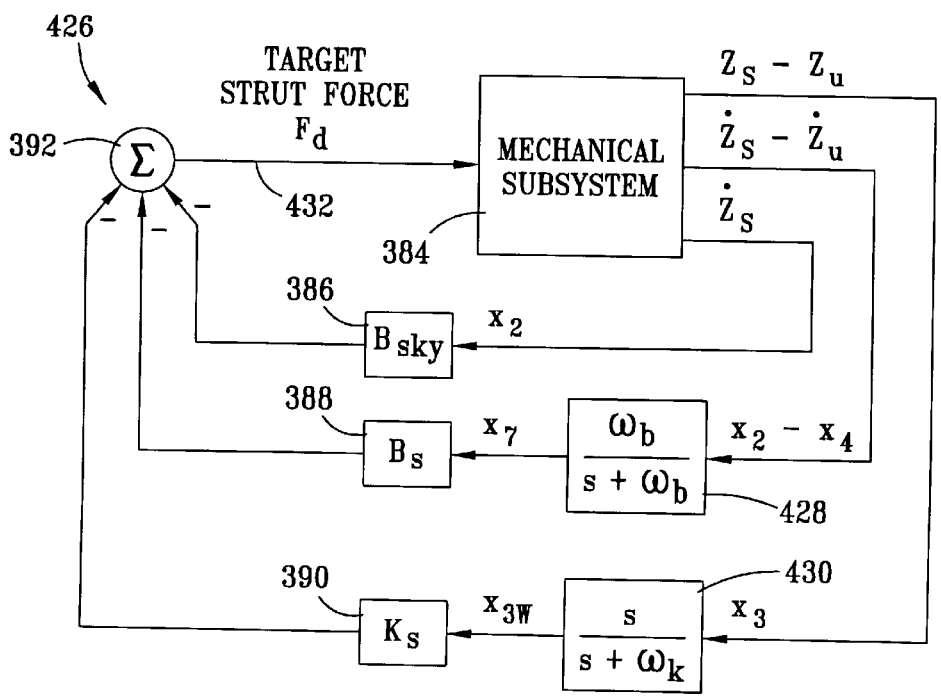
FIG. 28 is a schematic diagram depicting a feedback loop system for operating a strut containing compressible fluid in a suspension system having frequency dependent filtering.

A revised filtered feedback scheme 426 is shown in FIG. 28. This scheme cannot be implemented using passive feedback, since the inputs to the spring constant ($K_s$) 390 and dampening coefficient ($B_s$) 388 are being dynamically selected using the equations for the high pass filter 428 and the low pass filter 430, set forth above, respectively. The filtered dynamics for $K_s$ and $B_s$ may be appended to the full state model of Equations (10) set forth above, by defining the augmented states and rewriting Equations (16) and (18) as $$\dot{x}_7 = \omega_b(x_2 - x_4 - x_7)$$

$$\dot{x}_8 = \omega_k(x_3 - x_8)$$

$$x_{3W} = x_3 - x_8. \quad (20)$$

Figure 29:
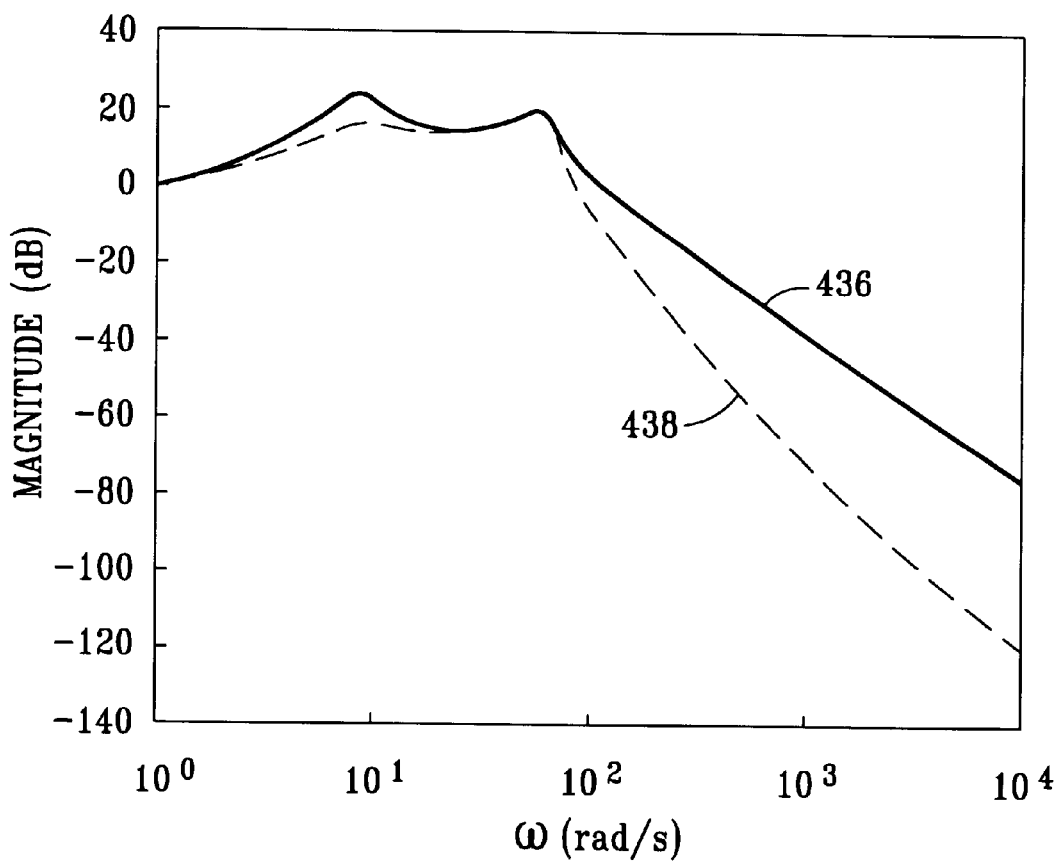
FIG. 29 is a graph of the effect of the frequency dependent filtering of the spring rate coefficient and the dampening coefficients of a suspension system.

Improved system performance will result using $K_s = 16812$ N/m and $B_s = 1000$ N/m/sec as the initial spring and dampening coefficients, and choosing both the dampening roll-off frequency $\omega_b$ and the spring constant roll-off frequency $\omega_k$ (at which reductions in the dampening constant and the spring constant begin) as being equal to the wheel frequency $\omega_o$. This is shown in FIG. 29, which shows the original Bode plot for passive dampening using fixed values of $K_s = 16812$ N/m, $B_s = 1000$ N/m/sec (solid line 436), and the Bode plot (dotted line 438) obtained when the roll-off filters are implemented. The Bode plot 438 shows improvements due to the effects of decreasing $K_s$ at low frequencies, and decreasing $B_s$ at high frequencies. Decreasing the spring constant $K_s$ at frequencies below the wheel frequency $\omega_o$ reduces disturbance effects at the body vibration modes, but may be undesirable since the soft spring may hit the suspension travel limits. Soft spring constants require motion limiting logic (or hard springs at the travel limits) as well as ride height control to center the suspension travel excursions.

Figure 30:
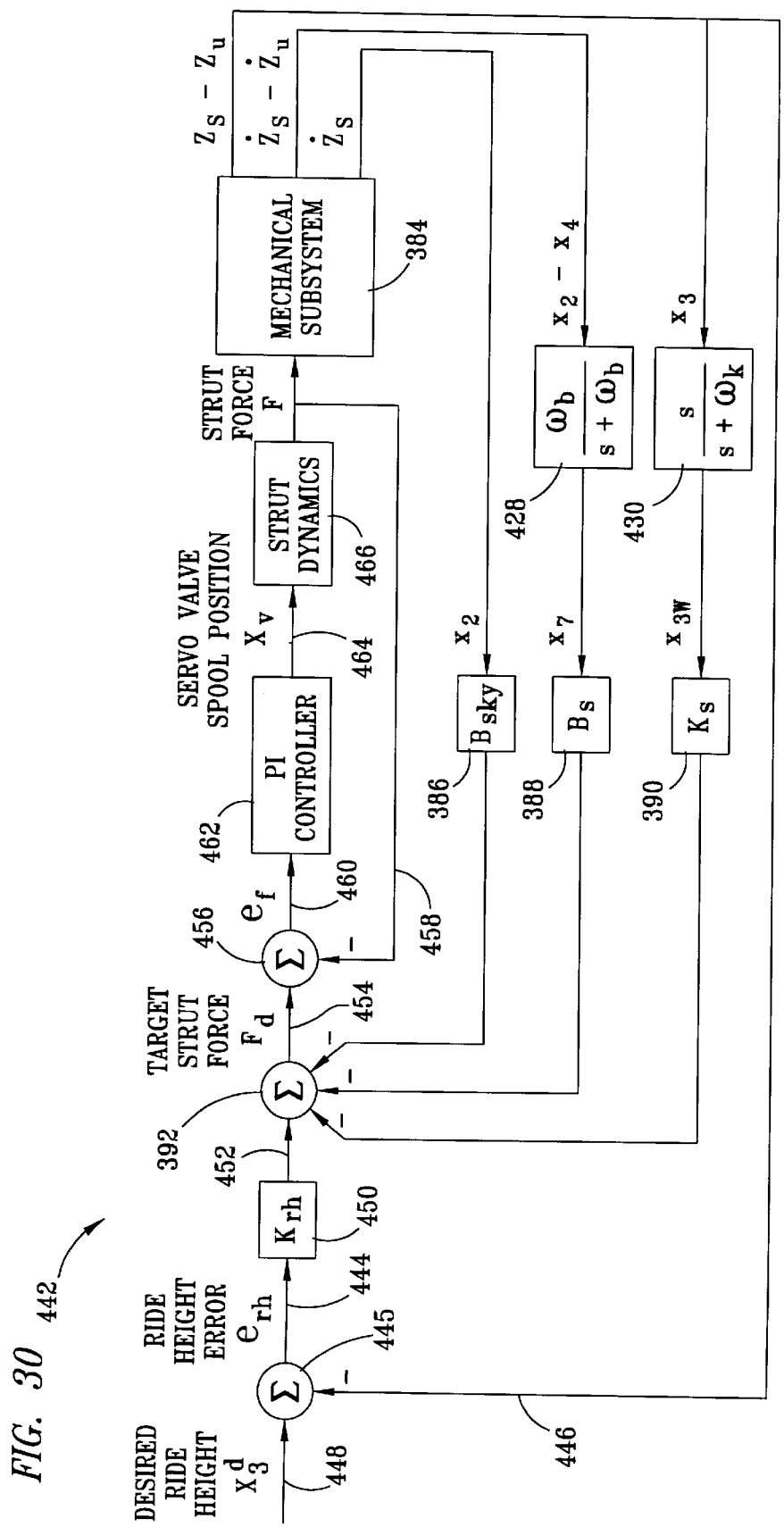
FIG. 30 is a schematic diagram depicting an active dampening control system for operation of a suspension system.

FIG. 30 is a schematic diagram showing the overall active-dampening control system 442. The first feedback loop configuration of FIG. 28 is used in conjunction with an additional ride height error $e_{rh}$ term 444 to compute the ideal target strut force $F_d$, which is defined by the equation $$F_d = K_{rh}e_{rh} - K_s x_{3W} - B_s x_7 - B_{sky} x_2 \quad (21)$$

where $e_{rh} = x^d_3 - x_3$, $K_{rh}$ is the ride height error gain 450, the desired ride height 448 is $x_3^d(t)$, and $x_3$ is the control ride height input 446. The desired ride height 448 and the actual ride height 446 are input to a summation unit 445 to determine a ride height error 444, which is input into the ride height error gain unit 450. The ride height correction 452 is input to the summation step 392 to provide the target strut, force Fd output 454.

The force error term $e_f$ used in the proportional-plus-integral (PI) controller is computed as $$e_f = F_d - F. \quad (22)$$

F is the actual force 458 being applied by the strut, and $F_d$ is the target strut force 454, which are summed in the device 456.

The output of the PI controller 462 is the desired servo-valve spool position ($x_v$) 464 given as $$x_v = u_1 = K_p e_f + K_I \int e_f, \quad (23)$$

where $K_p$ and $K_I$ are the proportional and integral control gains, respectively, applied to strut dynamics 466. The integral of $e_f$ can be realized by adding the state equation $$\dot{x}_9 = e_f.$$

Combining equations (10) (11) and (20) and using the parameter values in equations (12) gives us the over all system state equations as follows:

$$\dot{x} = x_2$$

$$\dot{x}_2 = 1/m_s(-m_s g + F) \quad (24)$$

$$\dot{x}_3 = x_2 - x_4$$

$$\dot{x}_4 = \frac{1}{m_u}\left(-m_u g + K_1(u_2 - x_1 + x_3) - F\right)$$

$$\dot{x}_5 = \beta_2\left(\frac{Q_L + (A_c - A_r)(x_2 - x_4)}{V_{o2} - (A_c - A_r)x_3}\right)$$

$$\dot{x}_6 = \beta_1\left(\frac{Q - Q_L + A_c(x_2 - x_4)}{V_{o1} + A_c x_3}\right)$$

$$\dot{x}_7 = \omega_b(x_2 - x_4 - x_7)$$

$$\dot{x}_8 = \omega_k(x_3 - x_8)$$

$$\dot{x}_9 = e_f$$

where $$y = F = A_c x_6 - (A_c - A_r)x_5$$

$$F_d = K_{rh}e_{rh} - K_s x_{3W} - B_s x_7 - B_{sky} x_2$$

$$e_{rh} = x_3^d - x_3$$

$$e_f = F_d - F$$

$$u_1 = K_p e_f + K_I x_9 \quad (25)$$

$$u_2 = z_r = 0.04\sin(\omega t)$$

$$Q = C_d w u_1 \sqrt{2|P_a sat(u_1) - x_6|/\rho}$$

$$Q_L = C_d A_o sgn(x_6 - x_5) \sqrt{2|x_6 - x_5|/\rho},$$

$$\beta_1 = 171617.03249 \sqrt{1 + (7.718658 \times 10^{-5} x_6)^2}$$

$$\beta_2 = 171617.03249 \sqrt{1 + (7.718658 \times 10^{-5} x_5)^2}$$

Figure 31:
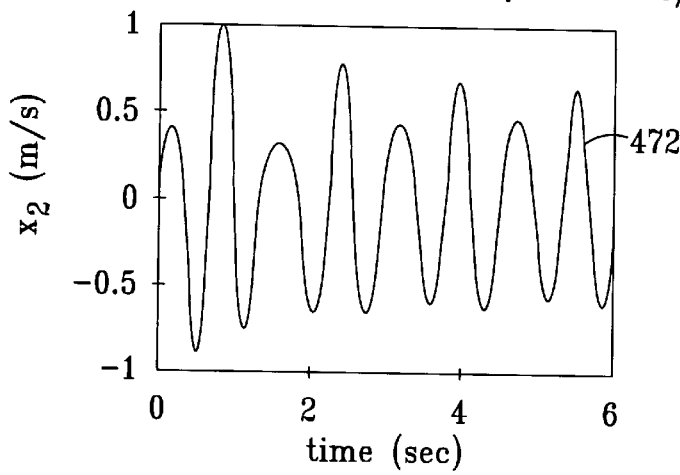
FIGS. 31 through 36 are graphs of displacement versus time for operation of a suspension system according to the active dampening control system.
Figure 32:
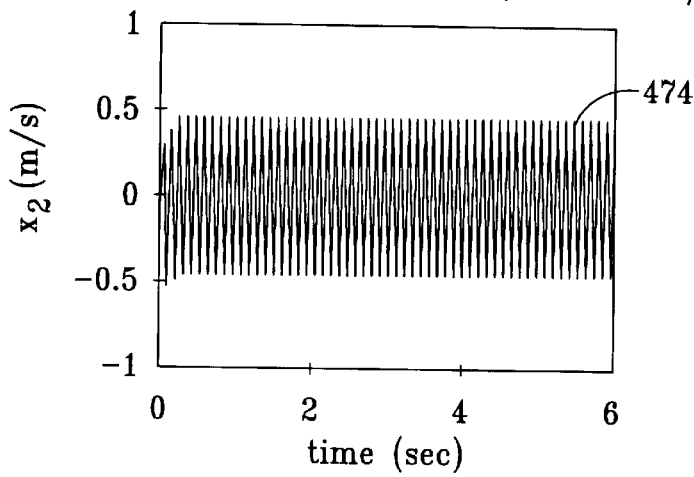
Figure 33:
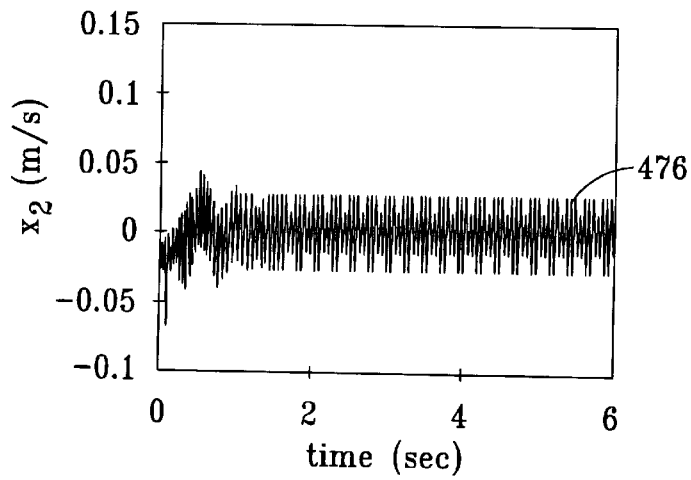

FIGS. 31 through 33 depict test data for an application of the control suspension system which was simulated for three different values of frequency for the input terrain disturbance $u_2$. The input values selected for terrain disturbances ($u_2$) in the simulation were $\omega = 8$ rad/sec (FIG. 31), $\omega = 58$ rad/sec=$\omega_o$ (FIG. 32), and $\omega = 150$ rad/sec (FIG. 33). Other selected valves for the simulation were $K_{rh} = 16812$ N/m, $K_s = 16812$ N/m, $B_s = 1000$ N/m/sec, and $B_{sky} = 2000$ N/m/sec. FIGS. 31 through 33 show the payload velocity $x_2$ time plots 472, 474 and 476, respectively, for the open loop case with $u_1 = 0$. The sinusoidal amplitude decreased as the frequency $\omega$ was increased.

Figure 34:
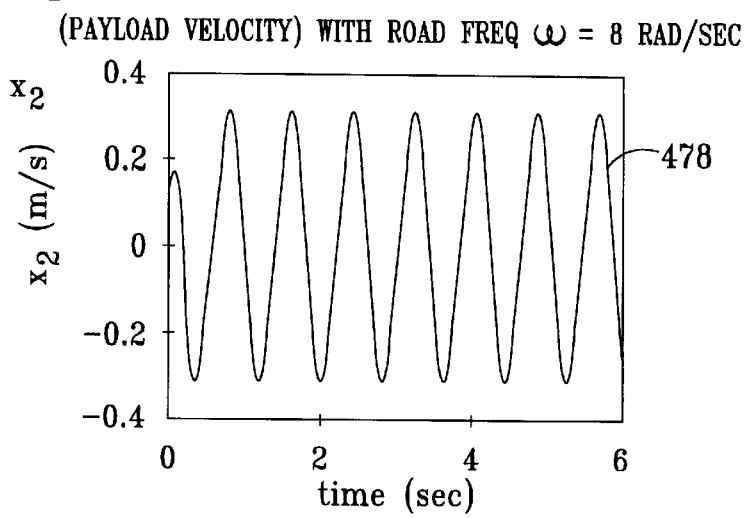
Figure 35:
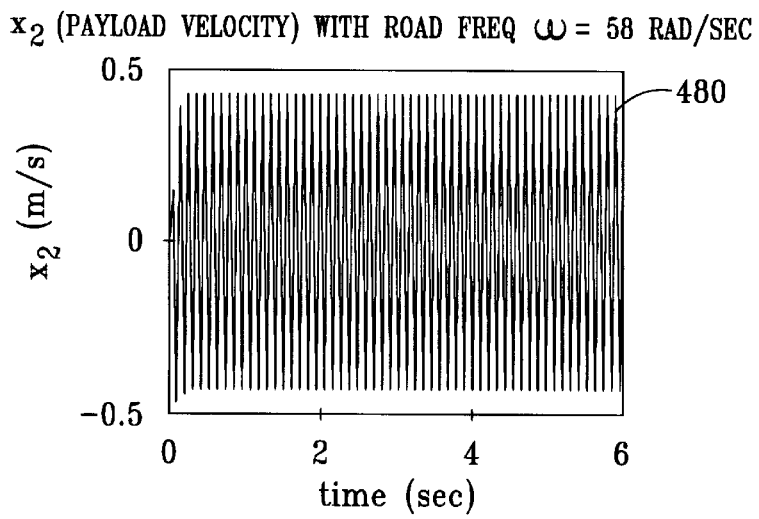
Figure 36:
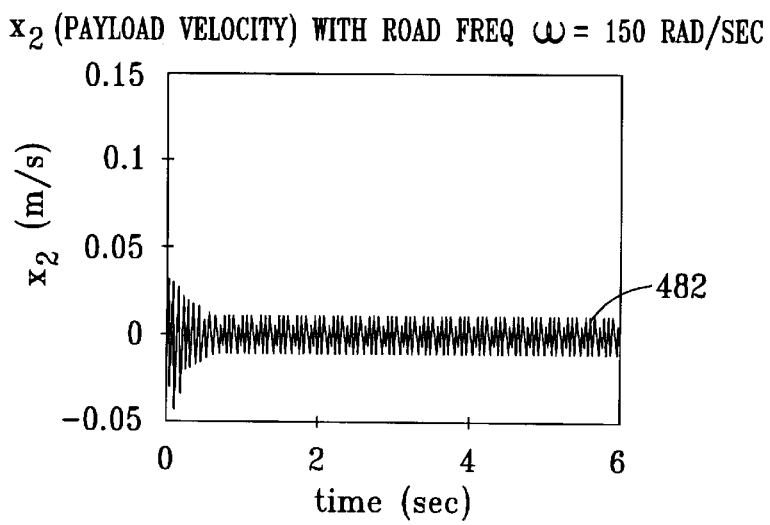

FIGS. 34 through 36 show plots 478, 480 and 482, respectively, for test data from the system simulated with the active dampening controller. The plots 478, 480 and 482 show that the controller reduces the payload velocity $x_2$ at the low and high frequency terrain disturbances $u_2$ of $\omega = 8$ rad/sec (FIG. 34) and $\omega = 150$ rad/sec (FIG. 36), respectively, but performance when $u_2$ is at the wheel frequency $\omega = 58$ rad/sec (FIG. 35) is unaffected. This is consistent with the Bode plot analysis of FIGS. 34 through 36 which shows improved payload velocity performance above and below $\omega_o$.

Figure 37:
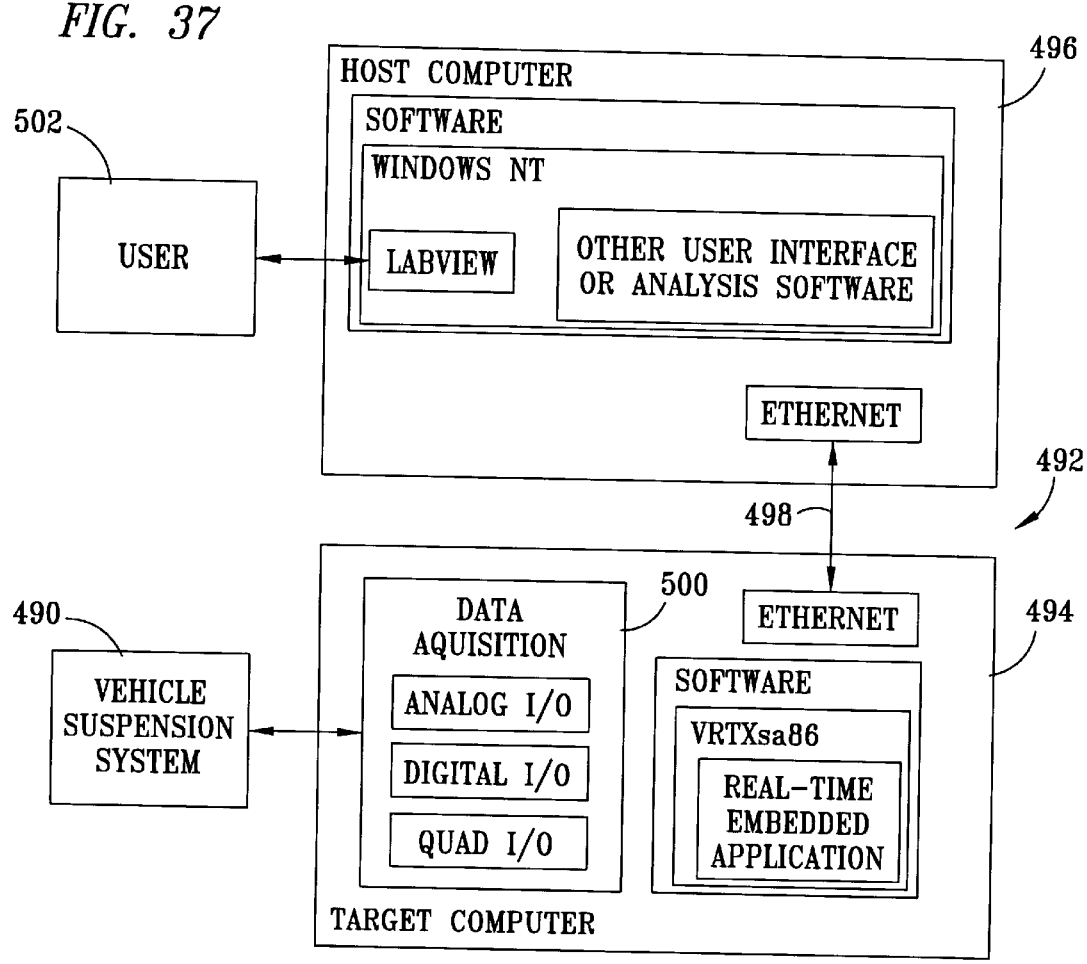
FIG. 37 is a schematic diagram of a controller for controlling a suspension system.

FIG. 37 is a schematic diagram of a "PC-PC" controller 492, providing a Real-Time Control System (RTCS) for implementing the control technique discussed above for the vehicle suspension system 490. One computer (target computer) 494 is used for real-time control, and a second computer (host computer) 496 is used for the user interface 502 to the controller 492. Both computers 494 and 496 are preferably industry standard IBM PC compatibles, such as those used for standard desktop models or those which are industrially ruggedized. The division of labor between two computers 494 and 496 allows the use of an operating system that is most suitable to the task at hand for each subsystem. The VRTXsa86 RTOS available from Microtec is used on the target computer 494, while Microsoft Windows NT is used on the host computer 496. The computers 494 and 496 communicate via TCP/IP protocol interconnection 498. Preferably, a single cable can directly connect the two computers 494 and 496. In other embodiments, the two computers may be connected to the same local or wide-area network. Since TCP/IP is the Internet transport protocol, the Internet itself or a wireless LAN can be used as the communications link.

The Data acquisition on the target computer 494 is accomplished using IndustryPack (IP) products available from SBS Greenspring Modular I/O and Systran Corporation IPs which support simple Input/Output (I/O) of digital and analog data. Each IP is about the size of a business card. Four to six IPs plug onto a carrier board that contains the host bus interface and external cable connections. Carrier boards are implemented on 3U VME, 6U VME, NuBus, ISA bus, EISA us, VXI and MultiBus II, PCI and Compact PCI. Specific board support packages were written in C-code for each IP used in the PC-PC controller. The goal of the PC-PC controller 492 is not only to simplify the implementation of advanced control algorithms, but also to allow an unprecedented level of real-time system monitoring and interaction with the user. Any signal processed by the controller 492 is accessible to the host computer at any time. All control system gains and configuration parameters can be viewed and modified while the controller is operating.

FIG. 38 is a partial, sectional view showing a frame 514 and wheels 518 which are connected together by a MacPherson strut suspension 520. The MacPherson strut suspension 520 includes a support member 522 provided by a pivot arm linkage which is of a MacPherson strut type. The support member 522 is connected to the frame 514 by a bearing assembly 524. A bearing 540 connects the other end of the support member 522 to an axle mount 526, to which the wheel 518 is rotatably connected. A strut 528 containing a compressible fluid, as shown for the struts 28, connects from the frame 514 to the axle mount 526 to which the wheel 518 is rotatable connected. Flow lines 530 connect from a control unit 532 to the spring strut 528. A bearing assembly 538 connects the upper portion of the strut 528 to the frame 514. The strut 528 maybe the same as that shown above for the strut 28. The control unit 542 may be operated according to the same methods as described herein for the control unit 32 discussed above.

In FIG. 38, a reference datum 546 provides a sky-hook reference datum point, relative to the frame 514 and the wheels 518. The left side wheel 518 is shown in a rebound mode, moving from a height 550 beneath the reference datum 546 back to a ride height at which the wheel rests at a reference datum 546, as shown in the right side wheel 518 in FIG. 38. In FIG. 39, the wheel 518 is shown after it has been jounced, above the referenced data 546 a distance 548.

Figure 40:
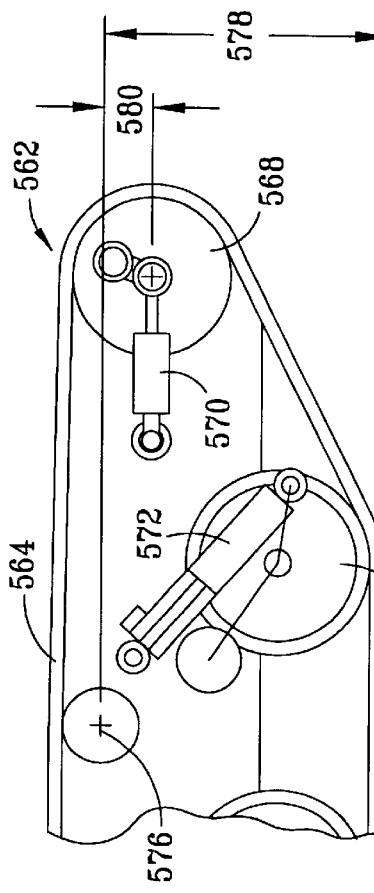
FIG. 40 is a side elevation view of a track for an armored tank.
Figure 41:
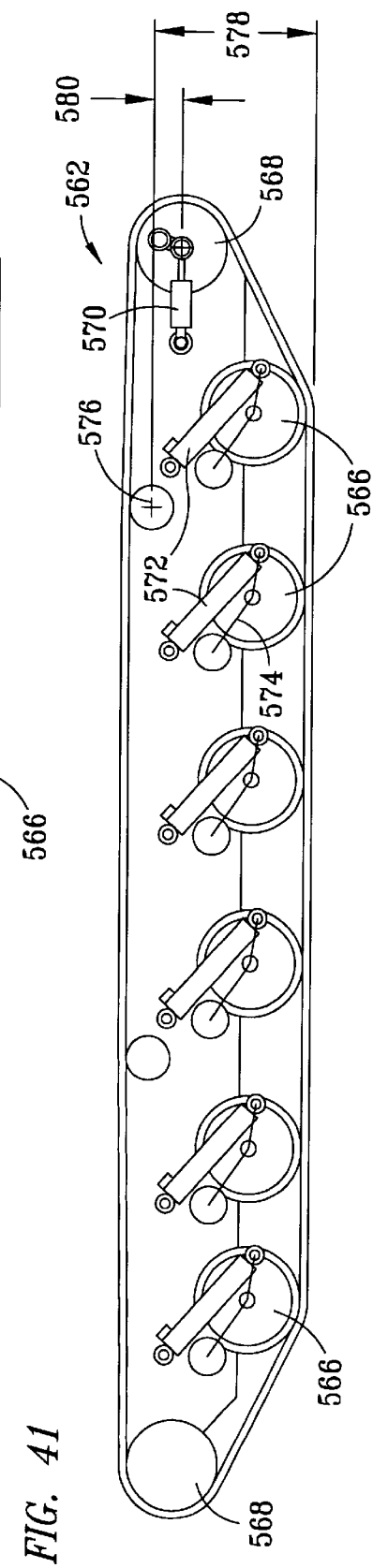
FIG. 41 is a partial side elevation view of the tank track.
Figure 42:
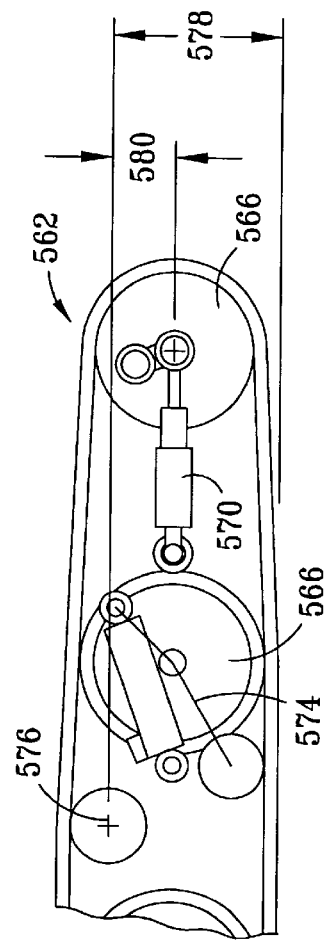
FIG. 42 is a partial side elevation view of the tank track after being lowered to a reduced ride height.

FIGS. 40 through 42 are partial, side elevation views of a tank track and suspension system 562, with the suspension system 562 being operated to dispose the tank at various right heights. The tank track and suspension system 562 includes a track 564 which is driven and tensioned by track rollers 566 and iddler rollers 568. Tension is applied to the track 564 by the rollers 566 and 568, which are positioned by tension struts 572 and tension struts 570, respectively. The tension struts 572 and 570 are preferably of the type having a compressible fluid, such as the strut 28 having a compressible fluid 42 discussed above. The amount of compressible fluid 42 disposed within various ones of the tensioner struts 570 and 572 is preferably determined by control unit 252 (shown in FIGS. 15 and 16), which are directly mounted to respective ones of the tensioner struts 570 and 572 and operated according to the method described above in reference to FIGS. 17 through 37. In other embodiments, a control system 32 or 232 may utilized by various ones of the tensioner struts 570 and 572 according to the method set forth above in reference to FIGS. 17 through 37.

The tensioner struts 572 are connected to various ones of the roller linkages 574. A reference point 576 is selected for the tank to determine a right height 578, with reference to the height of the reference point 576 above a ground surface. The vertical height 580 of the reference point 576 above a central axis of rotation of the iddler rollers 576 is also shown. The height 580 of the reference point 576 above the central axis of the track iddler roller 568 may change, but preferably only by small distances. The tensioner struts 570 are selectably extended and retracted for selectively removing the slack from the track 568 as the tensioner struts 572 are selectably extended and retracted to move the roller linkages 574 to position the track rollers 566 in selected positions, which selectively determines the right height 578 of the tank. The tank track and suspension system 562 can thus be operated to provide a selective amount of slack or tension within the track 564, such as flattening the right height 578 from that shown in FIGS. 40 and 41 to that shown in FIG. 42. The track 564 may also be drooped for a selective distance to allow access to various components of the tank.

The present invention provides a filtered feedback control system incorporating a compressible fluid, suspension strut in an active suspension. The compressible fluid, suspension strut fully integrates spring and dampening functions into one compact strut unit. Motions of the sprung mass above and below the wheel frequency are mitigated using skyhook dampening plus active filtering of spring and dampening coefficients. Skyhook dampening is applied using an absolute vehicle velocity relative to a reference datum. Frequency-dependent filtering is accomplished through an outer control loop and inner control loop which were summed together to generate a target strut force. The systems described herein have power requirements which are reduced to low levels as compared to the prior art, while achieving significant performance levels over prior art suspension systems.

Although the preferred embodiment has been described in detail, it should be understood that various changes, substitutions and alterations can be made therein without departing from the spirit and scope of the invention as defined by the appended claims.

What is claimed is:

1. A strut of a suspension system for supporting a suspended body from a support member which is subject to vibratory motion, comprising:
   a cylinder having an interior bore, said bore defining a cylinder chamber;
   an aperture extending into said cylinder;
   a fluid displacement member moveably extending through said aperture and into said cylinder;
   a seal extending between said fluid displacement member and said aperture into said cylinder, and sealingly engaging therebetween;
   a compressible fluid disposed within said cylinder chamber, said compressible fluid having a fluid pressure;
   wherein movement of said fluid displacement member in a first direction through said aperture and into said cylinder chamber increases said fluid pressure in said chamber, such that said compressible fluid pressure exerts a resultant force which pushes against said fluid displacement member in a second direction;
   said cylinder being secured to one of said suspended body and said support member, and said fluid displacement member being secured to the other of said support member and said suspended body;
   a damper element moveably secured to said fluid displacement member, interiorly within said cylinder chamber, and being moveable with said fluid displacement member relative to said compressible fluid to restrict movement of said fluid displacement member relative to said compressible fluid, said damper element being moveable relative to said fluid displacement member from a first position to a second position to change the amount by which said damper element restricts movement of said fluid displacement member and said damper element relative to said compressible fluid; and
   a bias member for preventing said damper element from moving from said first position to said second position until a predetermined pressure differential is disposed across said damper element.

2. The strut of a suspension system according to claim 1, wherein said damper element comprises a protuberant member which extends transverse to a longitudinal axis of said fluid displacement member, toward an exterior of said cylinder.

3. The strut of a suspension system according to claim 1, wherein said fluid displacement member and said damper element together comprise:
   a rod which moveably extends through said aperture;
   a piston which is mounted to said rod, interiorly within said cylinder chamber, said piston having a flow passage which extends through said piston and is sized for restricting flow of said compressible fluid through said piston;
   a damper valve member disposed proximate to said flow passage and being moveable between said first and second positions relative to said flow passage, such that said damper valve member restricts flow through said flow passage when disposed in said first position and opens said flow passage for increased fluid flow when disposed in said second position; and
   said bias member preventing said damper valve member from moving from said first position to said second position until said predetermined pressure differential is disposed across said piston.

4. The strut of a suspension system according to claim 3, wherein said bias member comprises a resilient member disposed between said piston and said damper valve member.

5. The strut of a suspension system according to claim 4, wherein resilient member of said bias means comprises a coil spring.

6. A method for operating a strut of a suspension system for supporting a suspended body relative to a support member which is subject to vibratory motion, the strut having a cylinder defining a cylinder chamber, a cylinder head defined by an aperture which extends through the cylinder head and through which a fluid displacement member moveably extends, the cylinder and the fluid displacement member being secured to different ones of the suspended body and the support member, a seal which sealingly engages between the fluid displacement member and the first cylinder head, and a compressible fluid disposed within the cylinder chamber and having a fluid pressure, wherein movement of the fluid displacement member in a first direction through the aperture and into the cylinder chamber increases the fluid pressure in the chamber, such that the fluid pressure exerts a resultant force which pushes against the fluid displacement member in a second direction, the method comprising the steps of:
   providing a damper element which is secured to the fluid displacement member and disposed interiorly within the cylinder chamber, such that the damper element is moveable with the fluid displacement member relative to the compressible fluid to restrict movement of the fluid displacement member relative to the compressible fluid;
   moveably securing the damper element to the fluid displacement member, such that the damper element is moveable between first and second positions to change the amount by which the damper element restricts movement of the fluid displacement member and the damper element relative to the compressible fluid; and
   biasing the damper element toward the first position, such that the damper element will remain proximate to the first position until predetermined pressure differentials are disposed across the damper element to urge the damper element to move in a direction from the first position toward the second position.

7. A strut suspension system for supporting a suspended body relative to a support member which is subject to vibratory motion, comprising in combination:
  a strut having a cylinder with an interior bore defining a cylinder chamber, a compressible fluid disposed within said cylinder chamber, a fluid displacement member which is moveably extensible into said cylinder chamber, a seal which sealingly engages between said cylinder and said fluid displacement member for retaining said compressible fluid within said chamber, and a dampening member secured to said fluid displacement member disposed within said cylinder chamber;
  said strut being supportively engaged between said suspended body and said support member, wherein one end of said strut is connected by said fluid displacement member to one of said suspended body and said support member, and another end of said strut is connected by said cylinder to the other of said suspended body and said support member;
  means for controlling pressures of said compressible fluid within said cylinder chamber of said strut in response to control signals, wherein said pressures within said cylinder chamber determine values for spring rate coefficients and dampening coefficients of said strut;
  at least a first sensor for detecting relative positions of said suspended body to said support member;
  a data processing unit being operatively connected to said first sensor and said means for controlling pressures, and for emitting said control signals and controlling said pressures of said compressible fluid within said strut to determine said spring rate coefficients and said dampening coefficients in response to sensed values from said first sensors; and
  said data processing system further being operable for frequency dependent filtering in determining values for said spring rate coefficients and said dampening coefficients, such that said spring rate coefficients are decreased in response to detecting changes in said relative positions of said suspended body occurring at frequencies beneath a low frequency threshold level, and said dampening coefficients are decreased in response to detecting changes in relative motion between said suspended body and said support member occurring at frequencies above a high frequency threshold level.

8. The suspension system according to claim 7, wherein said spring rate coefficients and said dampening coefficients are decreased in proportion to the difference in value between detected frequencies and respective ones of said low and high frequency thresholds.

9. The suspension system according to claim 8, further comprising a second sensor for detecting movement of said wheel, and wherein said suspension system is used for automotive applications and said support member is directly connected to a wheel, and said low and high frequency thresholds correspond to detected frequencies of movement of said wheel.

10. The suspension system according to claim 9, wherein said low frequency threshold is disposed at a first offset beneath said detected frequencies of movement of said wheel and said support member, and said high frequency threshold is disposed at a second offset above said detected frequencies of movement of said wheel and said support member.

11. The suspension system according to claim 10, further comprising a second sensor for determining motion of said suspended body relative to a skyhook reference datum, separate from said wheel and said support member.

12. The suspension system according to claim 11, wherein said data processing unit is operative for determining movement of said suspended body relative to said skyhook datum, and determining skyhook dampening coefficients to, in part, determine said control signals applied to said means for controlling pressure for, in part, determining said dampening coefficients of said strut.

13. The suspension system according to claim 12, wherein said data processing unit is operable for determining differences from a desired ride height relative to said skyhook datum, from which are determined skyhook spring rate coefficients to, in part, determine said control signals applied to said means for controlling pressure for, in part, determining said spring rate coefficients of said strut.

14. The suspension system according to claim 13, wherein the ideal target for the force ($F_d$) applied by a particular strut is determined by the equation:

$$F_d = K_{rh}e_{rh} - K_s x_{3W} - B_s x_7 - B_{sky} x_2 \quad (18)$$

where $e_{rh} = x_3^d - x_3$, $K_{rh}$ is the ride height error gain, and $x_3^3(t)$ is equal to the desired ride height.

15. The suspension system according to claim 13, wherein the passive dampening constant ($B_s$) is determined by the equation:

$$B_s = \left(\frac{\omega b}{s + \omega b}\right) B_o.$$

16. The suspension system according to claim 13, wherein the spring constant ($K_s$) is determined by the equation:

$$K_s = K_o\left(\frac{s}{s + \omega_k}\right).$$

17. The suspension system according to claim 7, wherein said low frequency threshold level is different from said high frequency threshold level.

18. A strut suspension system for supporting a suspended body relative to a support member which is subject to vibratory motion, comprising in combination:
  a strut having a cylinder with an interior bore defining a cylinder chamber, a compressible fluid disposed within said cylinder chamber, a fluid displacement member which is moveably extensible into said cylinder chamber, a seal which sealingly engages between said cylinder and said fluid displacement member for retaining said compressible fluid within seal chamber, and a dampening member secured to said fluid displacement member and disposed within said cylinder chamber;
  said strut being supportively engaged between said suspended body and said support member, wherein one end of said strut is connected by said fluid displacement member to one of said suspended body and said support member, and another end of said strut is connected by said cylinder to the other of said suspended body and said support member;
  means for controlling pressures of said compressible fluid within said cylinder chamber of said strut in response to control signals, wherein said pressures within said cylinder chamber determine values for spring rate coefficients and dampening coefficients of said strut;
  at least a first sensor for determining positions of said suspended body;

a data processing unit being operatively connected to said first sensor and said means for controlling pressures, and emitting said control signals and controlling said pressures of said compressible fluid within said strut to determine control values for said spring rate coefficients and said dampening coefficients in response to sensed values from said first sensor;

said data processing with applying frequency dependent filtering for determining said spring rate coefficients and said dampening coefficients, such that said spring rate coefficients are decreased in response to detecting changes in said relative positions of said suspended body to said support member occurring at frequencies beneath a low frequency threshold level, and said dampening coefficients are decreased in response to detecting changes in relative motion between said suspended body and said support member occurring at frequencies above a high frequency threshold level;

said spring rate coefficients and said dampening coefficients being decreased in proportion to the differences in values between respective ones of said detected frequencies and respective ones of said low and high frequency thresholds;

wherein said suspension system is used for automotive applications and said support member is directly connected to a wheel, and said low and high frequency thresholds correspond to detected frequencies of movement of said wheel; and said low frequency threshold being disposed at a first selected offset beneath said detected frequencies of movement of said wheel, and said high frequency threshold being disposed at a second offset beneath said detected frequencies of movement of said wheel.

19. The suspension system according to claim 18, wherein said data processing unit is further operative for determining movement of said suspended body relative to a skyhook datum to determine skyhook dampening coefficients to, in part, determine said control signals applied to said means for controlling pressure for, in part, determining said dampening coefficients of said strut.

20. The suspension system according to claim 19, wherein said data processing unit is further operative for determining differences from a desired ride height relative to said skyhook datum to determine skyhook spring rate coefficients to, in part, determine said control signals, applied to said means for controlling pressure for, in part, determining said spring rate coefficients of said strut.

21. The suspension system according to claim 18 wherein said data processing unit is further operative for determining differences from a desired ride height relative to said skyhook datum, from said differences to determine skyhook spring rate coefficients to, in part, determine said control signals applied to said means for controlling pressure for, in part, determining said spring rate coefficients of said strut.

22. The suspension system according to claim 21, wherein the ideal target force ($F_d$) applied by a particular strut is determined by the equation:

$$F_d = K_{rh} e_{rh} - K_s x_{3W} - B_s x_7 - B_{sky} x_2 \quad (18)$$

where $e_{rh} = x_3^d - x_3$, $K_{rh}$ is the ride height error gain, and $x_3^d(t)$ is the desired right height.

23. The suspension system according to claim 21, wherein the passive dampening constant is determined by the equation:

$$B_s = \left(\frac{\omega b}{s + \omega b}\right) B_o.$$

24. The suspension system according to claim 21, wherein the spring constant $K_s$ is determined by the equation:

$$K_s = K_o \left(\frac{s}{s + \omega_k}\right).$$

25. A method for operating a strut suspension system for supporting a suspended body relative to a support member which is subject to vibratory motion, the suspension system having a strut with a cylinder defining a cylinder chamber, a cylinder head defined on an end of said cylinder by an aperture which extends through said cylinder head and through which a fluid displacement member moveably extends, the cylinder chamber and the fluid displacement member being secured to different ones of said suspended body and said support member, a seal which sealingly engages between the fluid displacement member and said cylinder head, a compressible fluid disposed within the cylinder chamber and having a fluid pressure, and a dampening member secured to said fluid displacement member and disposed within said cylinder chamber, wherein movement of the fluid displacement member in a first direction through the aperture and into the cylinder chamber increases the fluid pressure in the chamber, such that the fluid pressure exerts a resultant force which pushes against the fluid displacement member in a second direction, the method comprising the steps of:

providing a control system which selectively disposes the compressible fluid within the cylinder chamber, to control pressures of the compressible fluid within the cylinder chamber of the strut of the suspension system in response to control signals, wherein the pressures of the compressible fluid within the cylinder chamber determine values for spring rate coefficients and dampening coefficients of the strut;

providing at least a first sensor for detecting relative positions of said suspended body relative to said support member;

emitting the control signals and controlling the pressures of the compressible fluid within the strut to determine the spring rate coefficients and the dampening coefficients in response to sensed values from the first sensors; and filtering the control signals for determining the spring rate coefficients and the dampening coefficients according to detected wheel frequencies, such that the spring rate coefficients are decreased in response to detecting changes in the relative positions of the suspended body to said support member which occur at frequencies beneath a low frequency threshold level, and the dampening coefficients are decreased in response to detecting changes in relative motion between the suspended body and the support member which occur at frequencies above a high frequency threshold level.

26. The method according to claim 25, further comprising the steps of:

determining movement of the suspended body relative to a skyhook datum; and determining skyhook dampening coefficients in response to the determined movement of the suspended body relative to the skyhook datum to, in part, determine the control signals applied to the control system to control the pressure of the compressible fluid in the cylinder chamber, to, in part, determine the dampening coefficients of the strut.

27. The method according to claim 26, further comprising the steps of:
   determining differences from a desired ride height relative to the skyhook datum; and
   determining skyhook spring rate coefficients to, in part, determine the control signals applied to the control system to, in part, determine the spring rate coefficient of said strut.

28. The method according to claim 25, further comprising the step of:
   determining differences from a desired ride height relative to the skyhook datum; and
   determining skyhook spring rate coefficients to, in part, determine the control signals applied to the control system to, in part, determine the spring rate coefficients of said strut.

29. The method according to claim 25, further comprising the step of determining the force ($F_d$) applied by a particular strut according to the equation:

$$F_d = K_{rh}e_{rh} - K_s x_{3W} - B_s x_7 - B_{sky} x_2 \tag{18}$$

where $e_{rh} = x_3^d - x_3$, $K_{rh}$ is the ride height error gain, and $x_3^d(t)$ is the desired ride height.

30. The method according to claim 29, further comprising determining the passive dampening coefficient according to the equation:

$$B_s = \left(\frac{\omega b}{s + \omega b}\right) Bo.$$

31. The method according to claim 29, further comprising determining the spring content for a strut according to the equation:

$$K_s = K_o \left(\frac{s}{s + \omega_k}\right).$$

* * * * *